US 11,743,545 B2

(12) United States Patent
Harron et al.

(10) Patent No.: US 11,743,545 B2
(45) Date of Patent: *Aug. 29, 2023

(54) INTERACTIVE PROGRAMMING GUIDE

(71) Applicant: Gracenote, Inc., Emeryville, CA (US)

(72) Inventors: Wilson Harron, Berkeley, CA (US);
Oscar Celma Herrada, Oakland, CA
(US); Irene Zhu, San Francisco, CA
(US); Markus K. Cremer, Orinda, CA
(US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,002

(22) Filed: Jan. 5, 2021

(65) Prior Publication Data
US 2021/0127172 A1 Apr. 29, 2021

Related U.S. Application Data

(63) Continuation of application No. 15/857,115, filed on Dec. 28, 2017, now Pat. No. 10,917,697, which is a
(Continued)

(51) Int. Cl.
H04N 21/482 (2011.01)
H04N 21/431 (2011.01)
(Continued)

(52) U.S. Cl.
CPC ..... *H04N 21/4821* (2013.01); *H04N 21/2668* (2013.01); *H04N 21/4312* (2013.01);
(Continued)

(58) Field of Classification Search
CPC .......... H04N 21/4821; H04N 21/2668; H04N 21/4312; H04N 21/44226; H04N 21/4532;
(Continued)

(56) References Cited

U.S. PATENT DOCUMENTS 5,438,372 A 8/1995 Tsumori et al.
5,585,866 A 12/1996 Miller et al.
(Continued)

FOREIGN PATENT DOCUMENTS

WO 2015103384 7/2015

OTHER PUBLICATIONS

European Patent Office, "Extended European Search Report," issued in connection with European Patent Apphcation No. 14876379.0, dated Aug. 17, 2017, 10 pages.
(Continued)

*Primary Examiner* — Robert J Hance
*Assistant Examiner* — Akshay Doshi
(74) *Attorney, Agent, or Firm* — McDonnell Boehnen Hulbert & Berghoff LLP

(57) ABSTRACT

Techniques of providing an interactive programming guide with a personalized lineup are disclosed. In some embodiments, a profile is accessed, and a personalized lineup is determined based on the profile. The personalized lineup may include a corresponding media content identification assigned to each one of a plurality of sequential time slots, where each media content identification identifies media content for the corresponding time slot. A first interactive programming guide may be caused to be displayed on a first media content device associated with the profile, where the first interactive programming guide includes the personalized lineup.

20 Claims, 15 Drawing Sheets

Related U.S. Application Data continuation of application No. 15/334,752, filed on Oct. 26, 2016, now Pat. No. 9,877,079, which is a continuation of application No. 14/147,320, filed on Jan. 3, 2014, now Pat. No. 9,510,057.

(51) Int. Cl.

| | | |
|---|---|---|
| H04N 21/475 | (2011.01) | |
| H04N 21/442 | (2011.01) | |
| H04N 21/466 | (2011.01) | |
| H04N 21/472 | (2011.01) | |
| H04N 21/2668 | (2011.01) | |
| H04N 21/45 | (2011.01) | |
| H04N 21/454 | (2011.01) | |
| H04N 21/845 | (2011.01) | |

(52) U.S. Cl.
CPC ..... *H04N 21/44226* (2020.08); *H04N 21/454* (2013.01); *H04N 21/4532* (2013.01); *H04N 21/4668* (2013.01); *H04N 21/472* (2013.01); *H04N 21/4755* (2013.01); *H04N 21/482* (2013.01); *H04N 21/4826* (2013.01); *H04N 21/4828* (2013.01); *H04N 21/8456* (2013.01)

(58) Field of Classification Search
CPC ............. H04N 21/454; H04N 21/4668; H04N 21/472; H04N 21/4755; H04N 21/482; H04N 21/4826; H04N 21/4828; H04N 21/8456

See application file for complete search history.

(56) References Cited

U.S. PATENT DOCUMENTS

| | | | |
|---|---|---|---|
| 5,592,551 | A | 1/1997 | Lett et al. |
| 6,526,577 | B1 | 2/2003 | Knudson et al. |
| 6,839,072 | B2 | 1/2005 | Trajkovic et al. |
| 6,862,741 | B1 | 3/2005 | Grooters |
| 6,978,474 | B1 | 12/2005 | Sheppard et al. |
| 7,051,352 | B1 | 5/2006 | Schaffer |
| 7,076,793 | B1 | 7/2006 | Nakada et al. |
| 7,165,098 | B1 | 1/2007 | Boyer et al. |
| 7,895,624 | B1 | 2/2011 | Thomas et al. |
| 8,117,197 | B1 | 2/2012 | Cramer |
| 8,296,802 | B2 | 10/2012 | Lemmons et al. |
| 8,302,126 | B2 | 10/2012 | Allison et al. |
| 8,336,069 | B1 | 12/2012 | Kamen et al. |
| 8,578,300 | B2 | 11/2013 | Relyea et al. |
| 8,578,412 | B2 | 11/2013 | Van Vleck et al. |
| 8,578,419 | B2 | 11/2013 | Bayrakeri et al. |
| 8,656,431 | B2 | 2/2014 | Cavicchia |
| 8,806,536 | B2 | 8/2014 | Ellis et al. |
| 8,973,049 | B2 | 3/2015 | Pickelsimer et al. |
| 9,060,099 | B2 | 6/2015 | Beach et al. |
| 9,075,875 | B1 | 7/2015 | Maddison |
| 9,084,029 | B2 | 7/2015 | Angiolillo et al. |
| 9,230,212 | B2 | 1/2016 | Su |
| 9,294,817 | B2 | 3/2016 | Knudson et al. |
| 9,402,101 | B2 | 7/2016 | Hijikata et al. |
| 9,456,242 | B2 | 9/2016 | Ellis |
| 9,510,057 | B2 | 11/2016 | Harron et al. |
| 9,510,058 | B2 | 11/2016 | Gossweiler, III et al. |
| 9,648,377 | B2 | 5/2017 | Ellis |
| 9,877,079 | B2 | 1/2018 | Harron et al. |
| 2002/0056086 | A1 | 5/2002 | Yuen |
| 2002/0057336 | A1 | 5/2002 | Gaul et al. |
| 2002/0144268 | A1 | 10/2002 | Khoo et al. |
| 2003/0020744 | A1 | 1/2003 | Ellis et al. |
| 2003/0126600 | A1 | 7/2003 | Heuvelman |
| 2004/0025179 | A1 | 2/2004 | Russ et al. |
| 2004/0168185 | A1 | 8/2004 | Dawson et al. |
| 2005/0144638 | A1 | 6/2005 | Allison et al. |
| 2005/0155063 | A1 | 7/2005 | Bayrakeri et al. |
| 2005/0251825 | A1 | 11/2005 | Fukuda et al. |
| 2006/0174269 | A1 | 8/2006 | Hansen-Turton |
| 2006/0288367 | A1 | 12/2006 | Swix et al. |
| 2007/0156589 | A1 | 7/2007 | Zimler et al. |
| 2008/0022298 | A1 | 1/2008 | Cavicchia |
| 2008/0104624 | A1 | 5/2008 | Narasimhan et al. |
| 2010/0114857 | A1 | 5/2010 | Edwards et al. |
| 2010/0161380 | A1 | 6/2010 | Song et al. |
| 2011/0173663 | A1 | 7/2011 | Boudalier |
| 2011/0239253 | A1 | 9/2011 | West et al. |
| 2012/0167142 | A1 | 6/2012 | Hey |
| 2012/0331507 | A1 | 12/2012 | Klappert |
| 2013/0305287 | A1 | 11/2013 | Wong et al. |
| 2013/0332959 | A1 | 12/2013 | Kothari |
| 2013/0347037 | A1 | 12/2013 | Soroushian |
| 2014/0040942 | A1 | 2/2014 | Ellis et al. |
| 2014/0181855 | A1 | 6/2014 | Fife et al. |
| 2014/0278308 | A1 | 9/2014 | Liu et al. |
| 2014/0366064 | A1* | 12/2014 | Moreau ............... H04N 21/4314 725/45 |
| 2015/0201235 | A1 | 7/2015 | Ellis et al. |
| 2016/0080822 | A1 | 3/2016 | Arling et al. |
| 2017/0048587 | A1 | 2/2017 | Harron et al. |
| 2018/0124469 | A1 | 5/2018 | Harron et al. |

OTHER PUBLICATIONS

United States Patent and Trademark Office, "Corrected Notice of Allowability," issued in connection with U.S. Appl. No. 14/147,320, filed Aug. 31, 2016, (2 pages).

United States Patent and Trademark Office, "Non-final Office Action," issued in connection with U.S. Appl. No. 14/147,320, filed Aug. 10, 2015, (33 pages).

United States Patent and Trademark Office, "Notice of Allowance," issued in connection with U.S. Appl. No. 14/147,320, filed Jul. 20, 2016, (18 pages).

International Bureau, "International Preliminary Report on Patentability," issued in connection with International Application Serial No. PCT/US2014/072977, dated Jul. 5, 2016, (8 pages).

International Searching Authority, "International Search Report," issued in connection with International Application Serial No. PCT/US2014/072977, dated Mar. 24, 2015, (2 pages).

International Searching Authority, "Written Opinion," issued in connection with International Application Serial No. PCT/US2014/072977, dated Mar. 24, 2015, (7 pages).

United States Patent and Trademark Office, "Final Office Action," issued in connection with U.S. Appl. No. 15/334,752, filed Jun. 29, 2017, (14 pages).

United States Patent and Trademark Office, "Notice of Allowance," issued in connection with U.S. Appl. No. 15/334,752, filed Sep. 13, 2017, (9 pages).

United States Patent and Trademark Office, "Non-final Office Action," issued in connection with U.S. Appl. No. 15/334,752, filed Feb. 22, 2017, (13 pages).

United States Patent and Trademark Office, "Corrected Notice of Allowability," issued in connection with U.S. Appl. No. 15/334,752, filed Dec. 19, 2017, (2 pages).

IP Australia, "Examination Report No. 1," dated Jun. 7, 2019 in connection with Australian Patent Application No. 2014373710, (3 pages).

IP Australia, "Notice of Acceptance," dated Nov. 7, 2019 in connection with Australian Patent Application No. 2014373710, 3 pages.

United States Patent and Trademark Office, "Non-Final Office Action," issued in connection with U.S. Appl. No. 15/857,115, dated May 1, 2020, 26 pages.

United States Patent and Trademark Office, "Notice of Allowance and Fee(s) Due," issued in connection with U.S. Appl. No. 15/857,115, dated Oct. 2, 2020, 8 pages.

United States Patent and Trademark Office, "Corrected Notice of Allowance and Fee(s) Due," issued in connection with U.S. Appl. No. 15/857,115, dated Oct. 6, 2020, 4 pages.

* cited by examiner

INTERACTIVE PROGRAMMING GUIDE

PRIORITY APPLICATIONS

This patent arises from an application that is a continuation of U.S. patent application Ser. No. 15/857,115, filed Dec. 28, 2017, which is a continuation of U.S. patent application Ser. No. 15/334,752 issued as U.S. Pat. No. 9,877,079, filed Oct. 26, 2016, which is a continuation of U.S. patent application Ser. No. 14/147,320 issued as U.S. Pat. No. 9,510,057, filed Jan. 3, 2014. U.S. patent application Ser. No. 15/857,115, U.S. patent application Ser. No. 15/334,752, and U.S. patent application Ser. No. 14/147,320 are hereby incorporated by reference herein in their entirety.

TECHNICAL FIELD

The present application relates generally to the technical field of data processing, and, in various embodiments, to methods and systems of providing an interactive programming guide with a personalized lineup.

BACKGROUND

Currently, users of televisions and other media content devices must navigate their way through irrelevant content when browsing for something to watch. This process can be time consuming and sometimes fruitless, thereby resulting in a negative user experience.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
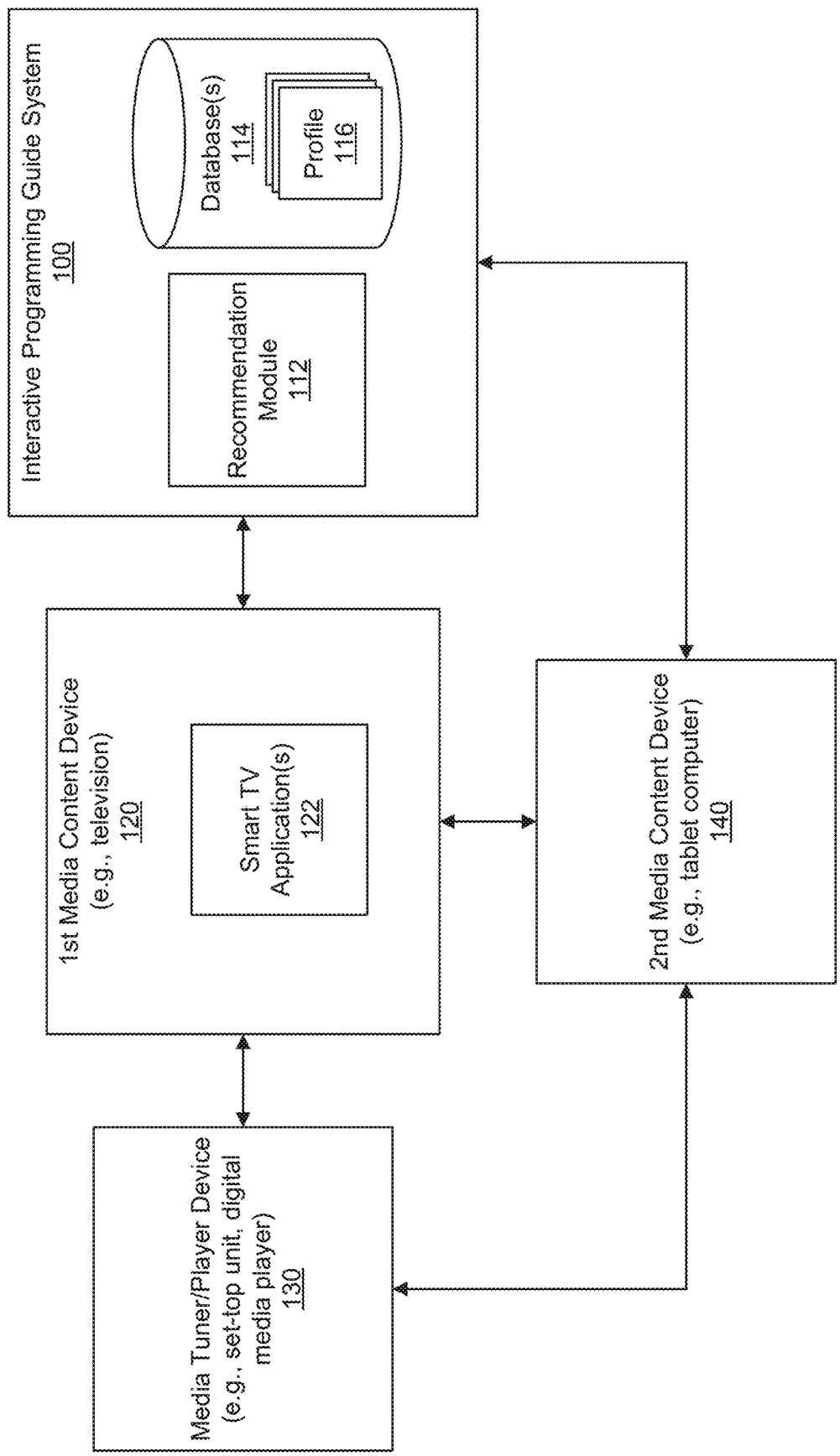
FIG. 1 is a block diagram illustrating an interactive programming guide system, in accordance with an example embodiment.

Example methods and systems of providing an interactive programming guide with a personalized lineup are disclosed. In the following description, for purposes of explanation, numerous specific details are set forth in order to provide a thorough understanding of example embodiments. It will be evident, however, to one skilled in the art that the present embodiments may be practiced without these specific details.

As will be disclosed herein, an interactive programming guide can be provided with a personalized lineup of media content relevant to a profile. The personalized lineup can be made up of recommended media content for current and upcoming time slots. The determination of which media content to recommend within the personalized lineup of the interactive programming guide can be based on a profile or multiple profiles associated with one or multiple users, which can include demographic information and/or a history of what media content has been viewed by the one or multiple users. The recommended media content of the personalized lineup can be displayed in a way that emphasizes the most relevant media content, such as by displaying the most relevant media content in the most accessible location and in the most noticeable way, thereby making the browsing experience more efficient.

In some embodiments, a method comprises accessing a profile, and determining a personalized lineup based on the profile. The personalized lineup may comprise a corresponding media content identification assigned to each one of a plurality of sequential time slots. Each media content identification can identify media content for the corresponding time slot. This identified media content may be media content that has been identified by a recommendation module as being the most relevant for a specific corresponding time slot. The method can further comprise causing a first interactive programming guide to be displayed on a first media content device associated with the profile. The first interactive programming guide may comprise the personalized lineup.

In some embodiments, the profile can be a profile of a user, a profile of a group of users (e.g., family members), or a profile of one or more specified devices (e.g., the family's kitchen TV). In some embodiments, the method further comprises receiving an indication of a user associated with the profile viewing additional media content, updating the profile based on the indication of the user viewing the additional media content, modifying the personalized lineup based on the updated profile, and causing the modified personalized lineup to be displayed on the first media content device. In some embodiments, the profile is a profile associated with the first media content device, and the method further comprises receiving an indication of additional media content being viewed on the first media content device, updating the profile based on the indication of the additional media content being viewed on the first media content device, modifying the personalized lineup based on the updated profile, and causing the modified personalized lineup to be displayed on the first media content device.

In some embodiments, the method further comprises receiving, via the first interactive programming guide, a request to assign a first different media content identification to a first one of the time slots, and modifying the personalized lineup in response to the request to assign the first different media content identification to the first one of the time slots. Modifying the personalized lineup may comprise assigning the first different media content identification to the first one of the time slots, determining a second different media content identification to assign to a second one of the time slots based on the assigning of the first different media content identification to the first one of the time slots, and assigning the second different media content identification to the second one of the time slots. The method may further comprise causing the modified personalized lineup to be displayed on the first media content device.

In some embodiments, receiving the request to assign the first different media content identification to the first one of the time slots comprises receiving a user selection of the first one of the time slots of the personalized lineup, determining a plurality of media content category options based on the profile and the user selection of the first one of the time slots, causing the plurality of media content category options to be displayed on the first media content device, receiving a user selection of one of the media content category options, determining a plurality of media content options based on the profile and the user selection of the one of the media content category options, causing the plurality of media content options to be displayed on the first media content device, and receiving a user selection of one of the media content options, the one of the media content options corresponding to the first different media content identification. In some embodiments, based on the user selection and the recommendations, the time slot locations/durations can change as well, which poses another degree of freedom that can be taken into account. In some embodiments, media content that cannot be time-shifted, such as due to the real-time nature of the program (e.g., sports or news), can be prioritized over media content that can be time-shifted or sequenced at will, such as content from Netflix® or YouTube®. Additionally, in some embodiments, different recommendations can be made based on what type of device the media content is being recommended for. Accordingly, in some embodiments, the media content recommended is limited to only media content that is available for viewing on the media content device for which the media content is being recommended. In one example, broadcast TV may be available for viewing on a user's television set, but not on the user's tablet computer. In that example, the TV programs may be removed from consideration for recommendation to the user when the user is using the tablet computer to watch media content.

In some embodiments, receiving the request to assign the first different media content identification to the first one of the time slots comprises receiving a user selection of the first one of the time slots of the personalized lineup, determining a plurality of media content options based on the profile and the user selection of the first one of the time slots, causing the plurality of media content options to be displayed on the media content device, and receiving a user selection of one of the media content options, the one of the media content options corresponding to the first different media content identification.

In some embodiments, the first media content device comprises one of a television, a laptop computer, a desktop computer, a tablet computer, and a smartphone. In some embodiments, the media content comprises video content scheduled for broadcast. In some embodiments, the media content also includes time-shifted broadcast content, either on the service provider side or on the client device side (e.g., Comcast catch-up TV, DVR, TiVo, etc.) In some embodiments, the video content comprises at least one of an episode of a television program and a non-episodic movie. In some embodiments, the media content may also include audio and radio broadcasts as well.

In some embodiments, the profile comprises a history of media content viewed by the user(s) associated with the profile. In some embodiments, the profile further comprises demographic information about the user(s) associated with the profile. In some embodiments, the history may also contain information about the time or situation when certain media content has been consumed (e.g., watched/viewed), such as the time of day, day of week, season, during what meal of the day (e.g., during dinner), whether it was viewed on-the-go (e.g., on a mobile device), or whether it was viewed as a side activity or a main activity. In some embodiments, identification techniques (e.g., fingerprinting techniques) can be used to identify media content that has previously been consumed (e.g., viewed). This identification can be used to establish a link to the media content's metadata. Recommendations can then be generated based on this metadata, and the resulting recommendations can be translated into the recommended time slot sequence in the personalized lineup.

In some embodiments, the method further comprises determining, based on the profile, a plurality of relevant media content for a first period of time from a plurality of available media content that are available to be viewed during the first period of time, and causing a second interactive programming guide to be displayed on a second media content device. The second interactive programming guide may comprise identifications of the relevant media content for the first period of time.

In some embodiments, the method further comprises determining a corresponding relevance measurement for each one of the plurality of relevant media content based on the profile, and causing the second interactive programming guide to be displayed comprises causing each one of the identifications of the relevant media content to be displayed having a corresponding size that has a direct relationship with the corresponding relevance measurement of the corresponding relevant media content. In some embodiments, causing the second interactive programming guide to be displayed comprises causing each one of the identifications of the relevant media content to be displayed having a corresponding indicator, other than size, that has a direct relationship with the corresponding relevance measurement of the corresponding relevant media content. Examples of other such indicators include, but are not limited to, color and positioning on the display screen.

In some embodiments, the method further comprises receiving, via the second interactive programming guide on the second media content device, a user selection of one of the identifications of relevant media content, and causing media content corresponding to the selected identification of relevant media content to be displayed on the first media content device in response to receiving the user selection of the identification of relevant media content.

In some embodiments, the method further comprises receiving, via the second interactive programming guide on the second media content device, a user selection of one of the identifications of relevant media content, and updating the profile based on the user selection of the identification of relevant media content.

In some embodiments, the method further comprises receiving, via the second interactive programming guide on the second media content device, a user request to view identifications of relevant media content for a second period of time, and determining, based on the updated profile, a second plurality of relevant media content for the second period of time from a second plurality of available media content that are available to be viewed during the second period of time. The method may further comprise causing identifications of the second plurality of relevant media content for the second period of time to be displayed on the second media content device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating an interactive programming guide system 100, in accordance with an example embodiment. In some embodiments, the interactive programming guide system 100 comprises a recommendation module 112 and one or more databases 114.

The recommendation module 112 may be configured to provide an interactive programming guide to a media content device, such as first media content device 120 or second media content device 140. In some embodiments, a media content device may comprise any electronic device configured to play media content, such as video content and/or audio content. Examples of media content devices include, but are not limited to, televisions, laptop computers, desktop computers, tablet computers, smartphones, gaming devices, and/or other devices capable of receiving and presenting audio, video, and/or other multimedia content. Although many of the examples discussed herein focus on video and TV media content, the same or corresponding features and mechanisms disclosed herein can apply to audio media content and the combination of terrestrial and satellite radio, online services, and locally available media content, as well as correspondences between TV series, audio books, albums, and artist's catalogs.

In some embodiments, a media content device may employ a media tuner/player device 130 configured to receive a stream of video and/or audio content from a content provider (e.g., cable or satellite television providers, web television providers, terrestrial or satellite radio stations, online music services, etc.) and play the stream of content by processing the stream and outputting information (e.g., digital or analog) usable by a display of the media content device to present or play back the video and/or audio content to a user employing the media content device. Examples of media tuner/player devices 130 include, but are not limited to, a set-top unit (e.g., a cable box) and a digital media player (e.g., an Apple TV® player or a Roku® player). In some embodiments, the media tuner/player device 130 may be separate and external from the media content device that is employing its services. In other embodiments, the media tuner/player device 130 may be integrated into the media content device that is employing its services.

In some embodiments, the first media content device 120 comprises a smart television. Accordingly, the first media content device 120 may comprise one or more smart TV applications 122 (e.g., Netflix or Hulu) to enable the playing of Internet-based and on-demand media content. Other configurations are also within the scope of the present disclosure.

The devices and systems disclosed herein can communicate with other devices and systems in a variety of ways. In some embodiments, the devices and systems can communicate via one or more networks. Examples of networks that can be used include, but are not limited to, a wired network, a wireless network (e.g., a mobile network or a Wi-Fi network), a radio or telecommunications network, a satellite network, a cable network, and so on. In some embodiments, the network may include one or more portions that constitute a private network (e.g., a cable television network or a satellite radio network), a public network (e.g., over-the-air broadcast channels or the Internet), and so on. Other configurations and ways of communicating information between devices and systems are also within the scope of the present disclosure.

Figure 2A:
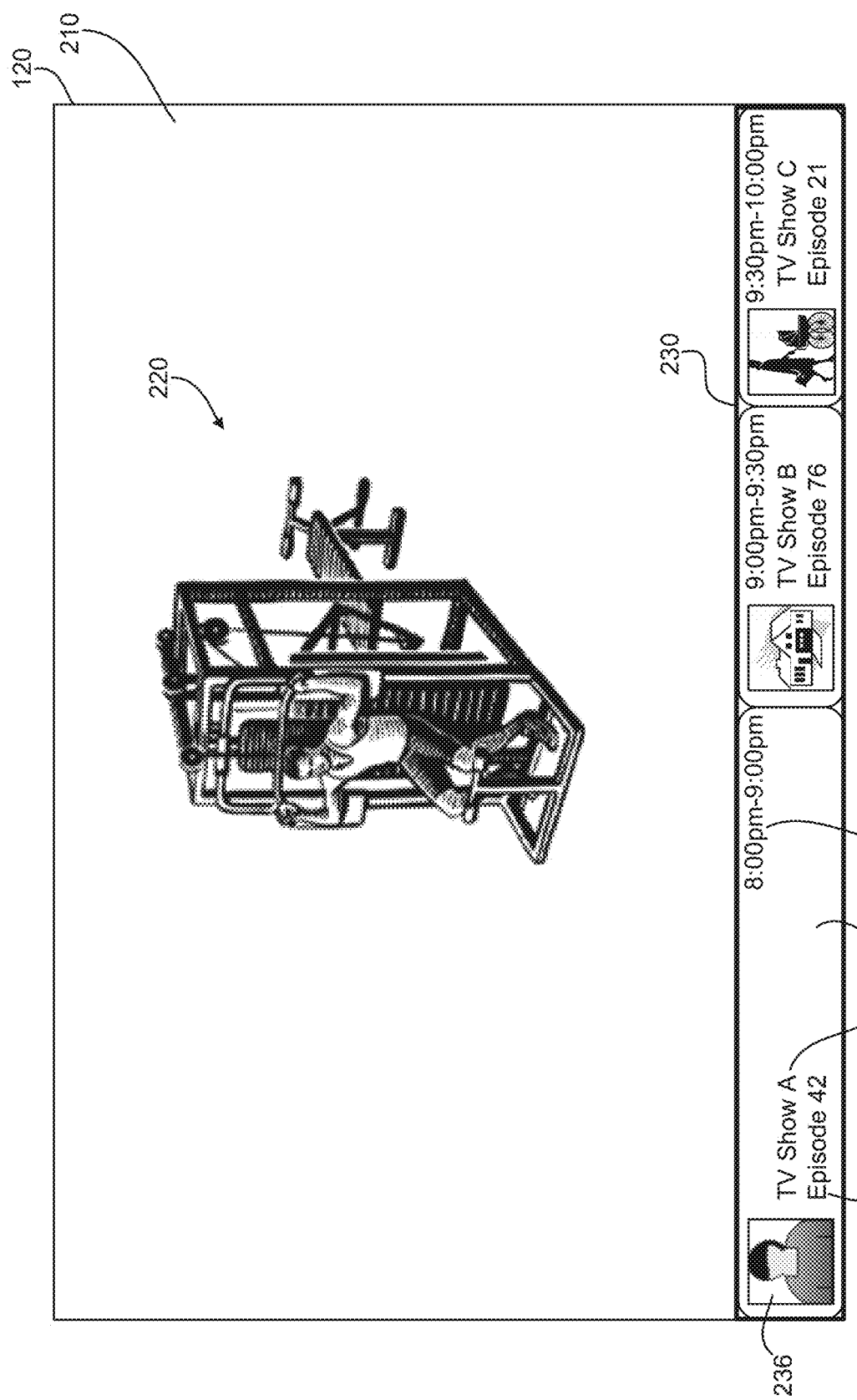
FIGS. 2A-2E illustrate an interactive programming guide being used on a media content device, in accordance with an example embodiment.

In some embodiments, first media content device 120 is configured to play media content, such as television episodes, "webisodes," user-generated content (e.g., videos on YouTube®, etc.), and movies. Referring to FIG. 2A, first media content device 120 comprises a display screen 210 on which to display media content 220. As previously mentioned, recommendation module 112 may be configured to provide an interactive programming guide to first media content device 120. In some embodiments, the interactive programming guide comprises a personalized lineup 230, which can be displayed on the display screen 210. The personalized lineup 230 can be made up of a plurality of time slots 232. In some embodiments, the time slots 232 are organized and displayed according to a time-based sequence (e.g., 8:00 pm-9:00 pm, then 9:00 pm-9:30 pm, and then 9:30 pm-10:00 pm, and so on and so forth). In some embodiments, there are no gaps between the time periods of the time slots 232 in the personalized lineup 230, such that the time period of one time slot 232 ends at the same time as the beginning of a time period for the next time slot 232 (e.g., 8:00 pm-9:00 pm, then 9:00 pm-9:30 pm). In some embodiments, there are gaps between some of the time periods of the time slots 232 in the personalized lineup 230 (e.g., 8:00 pm-9:00 pm, then 9:30 pm-10:00 pm). In some embodiments, each time slot duration can be dependent on the duration of the media content recommended for that time slot by the recommendation module 112. This time slot duration can be used by the recommendation module 112 to influence the start times and duration times of future subsequent time slots.

Each time slot 232 can comprise an indication 233 of the time period to which it corresponds, as well as corresponding media content identification information that identifies media content assigned to the corresponding time slot 232 in the personalized lineup 230. The media content identification information may comprise a name/title 234 of the media content, an episode identification 235, and/or an image 236 (e.g., show/movie logo) corresponding to the media content. Although not shown, each time slot 232 can also comprise an indication of the source (e.g., what television channel or what web-based source) of the corresponding media content. The identified media content can be media content that is scheduled for broadcast during the corresponding time slot 232 (e.g., television show A scheduled for broadcast during the 8:00 pm-9:00 pm time slot, television show B scheduled for broadcast during the 9:00 pm-9:30 pm time slot, television show C scheduled for broadcast during the 9:30 pm-10:00 pm time slot, and so on and so forth).

The recommendation module 112 may be configured to determine the personalized lineup 230 based on a user profile 116. User profiles 116 can be stored in one or more databases 114 of the interactive programming guide system 100 (FIG. 1). Each user profile 116 can be associated with and correspond to a particular media content device, a particular person, and/or a particular group of people. For example, one user profile 116 may correspond to a specific television set in a family's living room. In another example, another user profile 116 may correspond to one specific member of the family, no matter what media content device he or she is using. In this respect, the terms "user profile" and "profile of a user" can refer to a profile of a specified user, a profile of a specified group of specified users (e.g., family members), or a profile of one or more specified devices (e.g., the family's kitchen TV), and should not be interpreted to be limited to only a profile that belongs to a single specific user unless explicitly recited in the claims.

Furthermore, each user profile 116 can comprise a variety of information. In some embodiments, user profiles 116 comprise demographic information (e.g., age, gender, residence location, income, etc.). This information can be obtained via a registration process when first employing the services of the interactive programming guide system 100, or at other times and in other ways as well.

Each user profile 116 can comprise a history of what media content has been viewed and/or requested on a media content device corresponding to the profile 116 and/or what media content has been viewed and/or requested by a person corresponding to the profile 116. It is contemplated that multiple media content devices can be associated with and correspond to a single user profile 116. In one example, a family's user profile can include a history of the media content viewed and/or requested on televisions in the family's living room, kitchen, parents' bedroom, and children's bedrooms. In another example, each television set used by the family can be associated with and correspond to its own dedicated profile 116. In some embodiments, the recommendation module 112 can receive an indication of a user viewing additional media content, and then update the corresponding profile 116 of the user based on that indication. The recommendation module 112 can use the accumulated viewing history of the user(s) to create and modify the personalized lineup 230.

In some embodiments, the interactive programming guide system 100 can be separate and distinct from the first media content device 120 or from any media content device (e.g., second media content device 140). In some embodiments, the interactive programming guide system 100 can be integrated into the first media content device 120 or into any media content device (e.g., second media content device 140). In some embodiments, certain components (e.g., database 114) of the interactive programming guide system 100 can be separate and distinct from the first media content device 120 or from any media content device (e.g., second media content device 140), while other components (e.g., recommendation module 112) of the interactive programming guide system 100 can be integrated into the first media content device 120 or any media content device (e.g., second media content device 140). Other configurations are also within the scope of the present disclosure.

In some embodiments, the recommendation module 112 is configured to analyze the viewing history of the profile 116 and detect patterns in the viewing habits of the corresponding user(s), thereby enabling the recommendation module 112 to configure a personalized lineup 230 that identifies media content that the user(s) will most likely want to watch at particular times. In some embodiments, the recommendation module 112 uses a threshold amount of viewing time to determine whether a user's viewing of media content should be used in determining the personalized lineup 230. For example, the recommendation module 112 may require that at least fifty percent of a television show or movie be watched by the user(s) in order for the viewing of that television show or movie to be included in the corresponding profile 116 and/or used in determining the personalized lineup 230.

The recommendation module 112 can also use other information that indicates what media content will be most relevant to the user(s), including, but not limited to, social activity signals obtained from social network services (e.g., a user "liking" a TV show on Facebook®) and a purchase history of products corresponding to media content (e.g., a user buying the first season of a TV show on DVD or as an electronic download).

The recommendation module 112 can interpret different information in different ways and learn to draw certain conclusions for a profile 116 based on the particulars of the information. In one example, a user's viewing history may reflect that the user has seen every episode of a TV show that has been broadcast so far. The recommendation module 112 may then use this information to conclude that the user has an interest in viewing this TV show, and therefore may be more likely to recommend episodes of this TV show in the personalized lineup 230 for the user. However, the recommendation module 112 may assume that the user does not want to view any episodes that he or she has already seen. Accordingly, the recommendation module 112 may downgrade an episode's likelihood of being included in the personalized lineup 230 based on the user's viewing history indicating that the user has already seen that particular episode. However, the viewing history of the user may reflect that he or she has a history of viewing the same episode of that TV show multiple times, which the recommendation module 112 may interpret to be an indication that the user likes watching the same episode of that TV show multiple times. Accordingly, the recommendation module 112 may then use that information to increase the likelihood of including a recommendation of that TV show in the personalized lineup 230 for the user. This decision logic can also be correlated with user age and/or the type of TV show (or other media content). For example, children are much more likely to view the same episode of a TV show multiple times than adults. Accordingly, the recommendation module 112 may take into account this and other factors when determining what media content to recommend. Additionally, the recommendation module 112 may also prioritize media content that is determined to be catch-up media content. Catch-up media content may be media content that is ordinarily viewed before other media content but that the user has not viewed yet. For example, if a user has not seen the previous episode of a TV show, then this previous episode may be prioritized over new or subsequent episode of the same TV show, or over other shows.

In another example, the fact that a user has purchased a specific season of a TV show on DVD can be interpreted by the recommendation module 112 as an indication that the user has an interest in that TV show, thereby increasing the likelihood that episodes of that TV show will be included in the personalized lineup 230 for the user. However, the recommendation module 112 may determine that it should not recommend episodes of that TV show that are part of the season of the DVD purchased by the user on the principle that it should not recommend TV episodes that the user has in his or her possession to view at any time he or she desires. But, as previously mentioned, the recommendation module 112 may interpret the user's viewing history as indicating that the user enjoys watching the same episodes of the TV show multiple times, and therefore increase the likelihood of episodes of that season purchased on DVD by the user being included in the personalized lineup 230.

Variations on these kinds of upgrading and downgrading of media content for inclusion in the personalized lineup 230 are within the scope of the present disclosure. In some embodiments, the upgrading/increasing and downgrading/decreasing likelihood of media content being included in the personalized lineup 230 can be based on a relevance measurement system, where relevance measurements (e.g., scores) are determined for each media content for a particular time slot 232 (e.g., each TV episode or movie scheduled for broadcast during a particular time period). The relevance measurements can be determined based on the information and logic discussed above, as well as other information and logic. Each media content can then be ranked for a particular time slot 232 based on these relevance measurements. The recommendation module 112 can then select the highest ranking media content for a particular time period to be recommended for the corresponding time slot 232 in the personalized lineup 230. Other configurations are also within the scope of the present disclosure.

In some embodiments, the recommendation module 112 may also take into account how time sensitive certain media content is in determining whether to recommend it or how to affect its relevancy measurement. For example, content that is unique in time, such as major sporting events (e.g., the Olympics, Super Bowel, etc.) and news events, may have their relevancy measurements additionally increased based on their time sensitive nature.

The personalized lineup 230 can be interactive, allowing the user to change what media content 220 is currently being displayed by making selections for the corresponding time slot 232 on the personalized lineup 230. The user's interactions with the personalized lineup 230 can be used as a feedback loop to the interactive programming guide system 100 and recommendation module 112, where they may be used to affect recommendations of media content in the personalized lineup 230. For example, a user selection to watch certain media content can cause the replaced media content in the personalized lineup 230 to be downgraded in future considerations of relevancy by the recommendation module 112, while the selected media content can be upgraded in future considerations of relevancy by the recommendation module 112. Referring back to FIG. 2A, first media content device 120 may currently be displaying Episode 42 of TV Show A as the media content 220. If the user wants to watch different media content, then the user can select the corresponding time slot 232, which in this example would be the current time slot 232 of 8:00 pm-9:00 pm. The user can interact with the personalized lineup 230 and other parts of the interactive programming guide using a remote control. In some embodiments, another media content device, such as a tablet computer, can be used as a remote control.

Figure 2B:
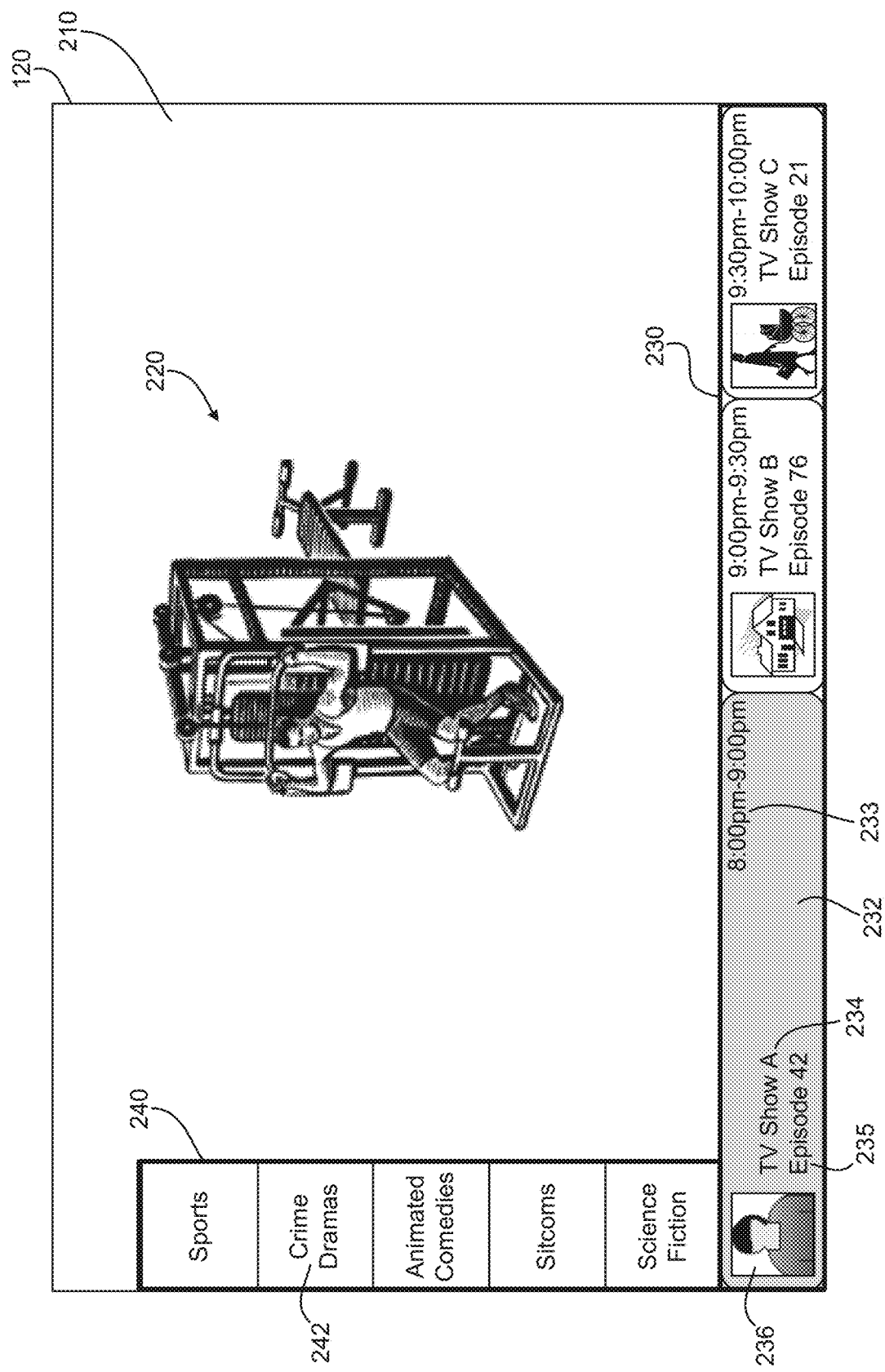

In FIG. 2B, the user has selected the current time slot 232. In response to this selection, the recommendation module 112 can cause the display of a drawer 240 of media content category options 242 from which the user can select. The recommendation module 112 can determine which media content category options 242 to display to the user either prior to or in response to the user's selection of the time slot 232. The determination of which media content category options 242 to display can be based on a corresponding profile 116. For example, the corresponding profile 116 may indicate that the user's favorite categories of media content are, in descending order, Science Fiction, Sitcoms, Animated Comedies, Crime Dramas, and Sports, based on an analysis of the user's viewing history, as well as other information in the corresponding profile 116. As a result, these categories may be displayed as media content category options 242.

In some embodiments, the corresponding profile 116 may indicate that a user prefers certain categories at certain times of the day and other categories at other times of the day. For example, the categories of Science Fiction, Sitcoms, Animated Comedies, Crime Dramas, and Sports may be the most relevant to the user for the 8:00 pm-9:00 pm time slot 232, but not for the 9:00 pm-9:30 pm time slot 232. Additionally, the corresponding profile 116 may indicate that a user prefers to watch certain categories of media content after watching a particular category of media content. For example, the user's viewing history may show that the user typically watches news programs just after watching a sitcom. The recommendation module 112 can use these indications to determine the most relevant media content category options 242, as well as the most relevant media content, to recommend to the user. In some embodiments, the recommendation module 112 can determine a relevance measurement for each media content category option 242 for a time slot 232, rank the media content category options 242 for the time slot 232, and determine which media content category options 242 to display based on the ranking, similar to the previously discussed determination of what media content to recommend.

In some embodiments, the recommendation module 112 can select the media content category options 242 from a plurality of pre-defined media content categories. In some embodiments, the recommendation module 112 is configured to enable users to create their own customized categories. In this respect, the media content category options 242 may include not only traditional categories, such as Science Fiction, Drama, and Sports, but also non-traditional categories. Examples of such non-traditional categories may include, but are not limited to, moods (e.g., happy, sad, stressed, etc.), weather (e.g., sunny, cloudy, rainy, etc.), and locations depicted in the media content (e.g., city, suburbs, countryside, wilderness, etc.). Other types of categories may include the sources of media content (e.g., TV cable provider, Hulu®, Netflix®, iTunes®, etc.), the price/quality of the content (e.g., HD content versus SD content, free content vs. rentable content versus buyable content), and content that is unique in time, such as major sporting events (e.g., the Olympics, Super Bowel, etc.) and news events. Other types of categories are also within the scope of the present disclosure.

Although the media content category options 242 are shown as being presented within a drawer 240 in FIG. 2B, it is contemplated that other graphical user interface elements and configurations are also within the scope of the present disclosure. In some embodiments, the display position of each media content category option 242 can be determined based on how relevant it is determined to be (e.g., by their corresponding relevance measurements). For example, the media content category option 242 determined to be the most relevant (e.g., Science Fiction in FIG. 2B) can be displayed as the closest media content category option 242 to the time slot 232 to which it corresponds, and the media content category option 242 determined to be the second most relevant (e.g., Sitcoms in FIG. 2B) can be displayed as the second closest media content category option 242 to the time slot 232 to which it corresponds, and so on and so forth, thereby making the most relevant media content category options 242 the most prominently displayed and reducing the distance the user must scan in order to find what is most relevant. As a result, the user experience can be made more efficient, and thus more enjoyable.

Figure 2C:
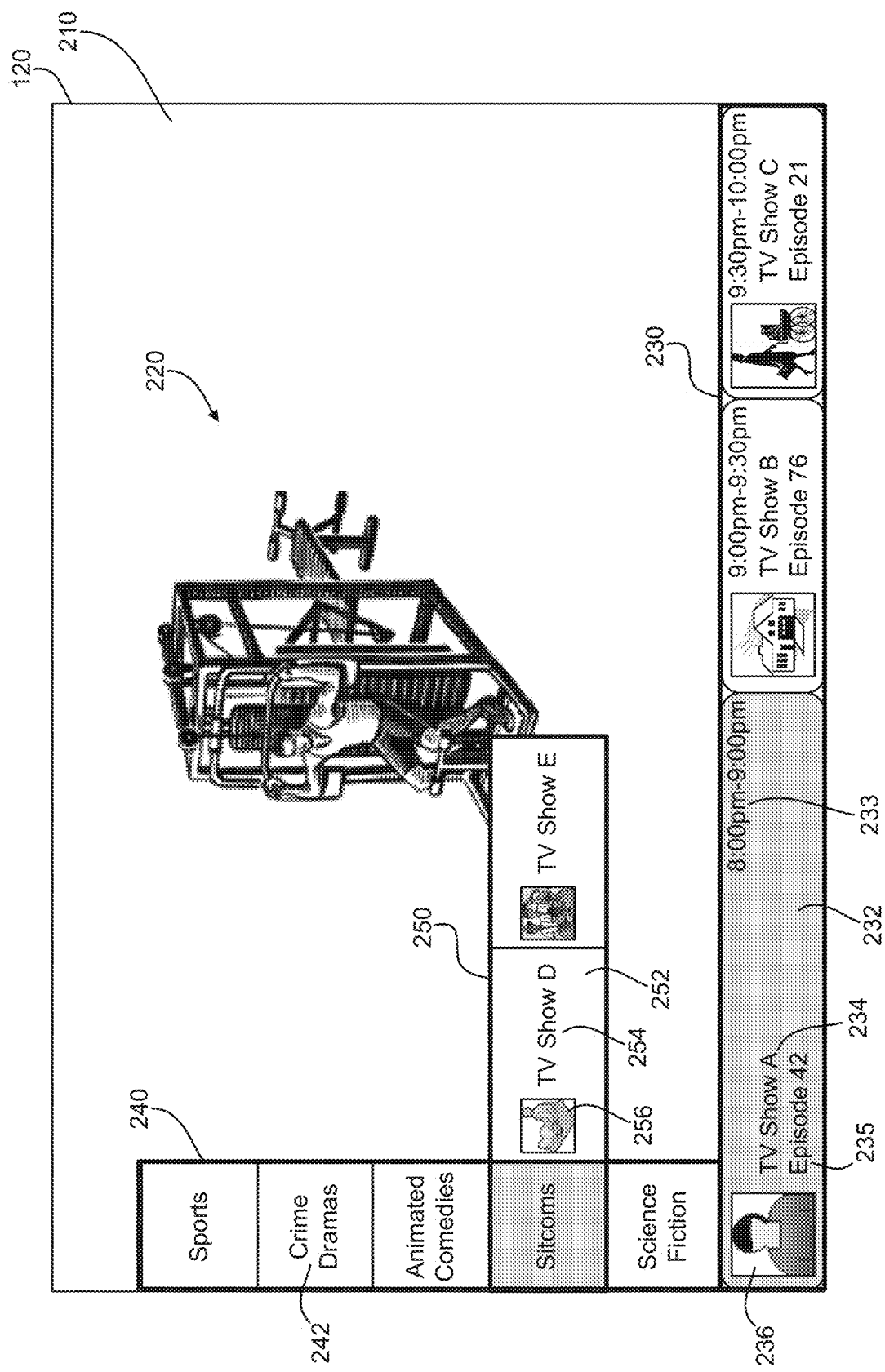

As seen in FIG. 2C, the user can select one of the media content category options 242. In response to this selection, the recommendation module 112 can cause the display of a drawer 250 of media content options 252 from which the user can select. Each media content option 252 can comprise media content identification information that identifies media content that corresponds to the selected media content category option 242 for the corresponding selected time slot 232. The media content identification information may comprise a name/title 254 of the media content and/or an image 256 (e.g., show/movie logo) corresponding to the media content. Other media content identification information can be provided as well, including, but not limited to, an episode identification and an indication of the source (e.g., what television channel or what web-based source) of the corresponding media content.

The recommendation module 112 can determine which media content options 252 to display to the user either prior to or in response to the user's selection of the media content category option 242. The determination of which media content options 252 to display can be based on a corresponding profile 116, as previously discussed.

Although the media content options 252 are shown as being presented within a drawer 250 in FIG. 2C, it is contemplated that other graphical user interface elements and configurations are also within the scope of the present disclosure. In some embodiments, the display position of each media content option 252 can be determined based on how relevant it is determined to be (e.g., by their corresponding relevance measurements). For example, the media content option 252 determined to be the most relevant (e.g., TV Show D in FIG. 2C) can be displayed as the closest media content option 252 to the selected media content category option 242 (e.g., Sitcoms in FIG. 2C), and the media content option 252 determined to be the second most relevant (e.g., TV Show E in FIG. 2C) can be displayed as the second closest media content option 252 to the selected media content category option 242 (e.g., Sitcoms in FIG. 2C), and so on and so forth, thereby making the most relevant media content options 252 the most prominently displayed and reducing the distance the user must scan in order to find what is most relevant. As a result, the user experience can be made more efficient, and thus more enjoyable.

In some embodiments, the media content options 252 may be presented in response to a selection of a corresponding time slot 232, without any presentation or selection of media content category options 242. In some embodiments, the media content options 252 may be displayed in a drawer 240 or other graphical user interface element extending directly from the corresponding time slot 232. Other configurations are also within the scope of the present disclosure.

Figure 2D:
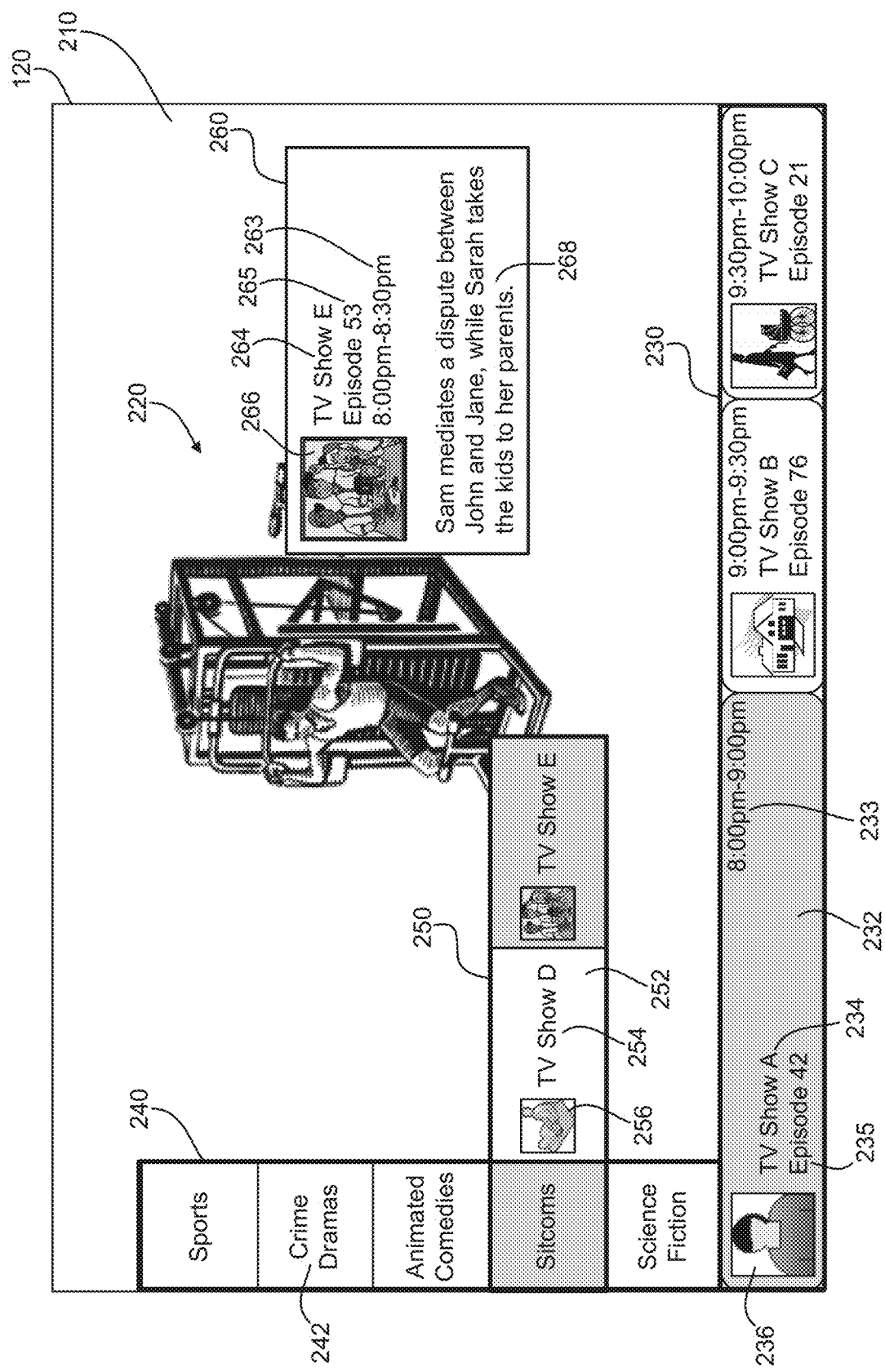

As seen in FIG. 2D, the user can select one of the media content options 252. In response to this selection, the recommendation module 112 can cause the display of a pop-up window 260. The pop-up window 260 may comprise information about the media content corresponding to the selected media content option 252. For example, the pop-up window 260 may comprise an indication 263 of the time period to which the selected media content option 252 corresponds, as well as corresponding media content identification information that identifies the selected media content option 252. The media content identification information may comprise a name/title 264 of the media content, an episode identification 265, and/or an image 266 (e.g., show/movie logo) corresponding to the media content. The pop-up window 260 may also comprise a plot description 268 of the selected media content option 252. Although not shown, the media content identification information can also comprise an indication of the source (e.g., what television channel or what web-based source) of the corresponding media content option 252. It is contemplated that other information and configurations are also within the scope of the present disclosure.

Figure 2E:
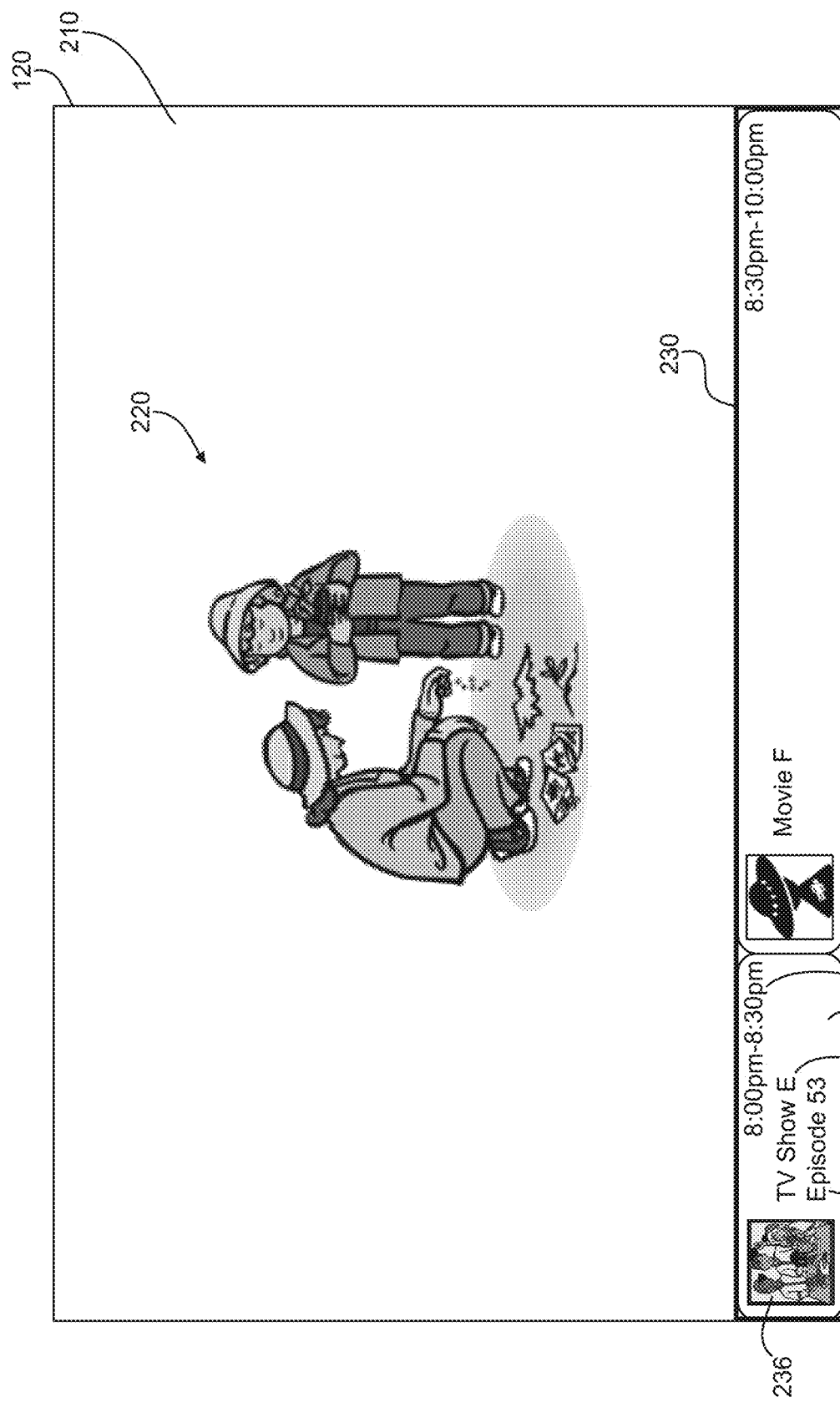

In some embodiments, the user may select a media content option 252 for current viewing in the current time slot 232. As seen in FIG. 2E, this selection can result in a change of the media content 220 being displayed on the media content device 120 from the previously viewed media content 220 of FIGS. 2A-2D to the newly selected media content 220 of FIG. 2E. Furthermore, the personalized lineup 230 can be updated to reflect this selection. In addition to modifying the media content identification information for the current time slot 232 (e.g., from 8:00 pm-9:00 pm in FIG. 2D to 8:00 pm-8:30 pm in FIG. 2E) in the personalized lineup 230, the recommendation module 112 can modify the personalized lineup 230 by adjusting subsequent time slots 232 (e.g., the time slots from 8:30 pm on in FIG. 2E) based on the selection and viewing of the media content option 252. In some embodiments, the recommendation module 112 can use this selection to immediately update the corresponding profile 116 and determine recommendations for the subsequent time slots 232. In some embodiments, the recommendation module 112 takes into account the new end time of the newly selected media content currently being viewed in determining what media content to recommend for subsequent time slots. For example, in FIGS. 2A-2D, TV Show A was currently being viewed. TV Show A had an end time of 9:00 pm. As a result, the recommendation module 112 recommended content for the 9:00 pm time slot 232 that began at 9:00 pm. When the user selected to currently watch TV Show E in FIG. 2E, the recommendation module 112 took into account the fact that TV Show E has an end time of 8:30 pm, and increased the relevancy of media content that has a start time at 8:30 pm, such as Movie F with a scheduled broadcast time period of 8:30 pm-10:00 pm in FIG. 2E. The recommendation module 112 can make these types of time-based and on-the-fly real-time scheduling considerations in determining recommendations of media content for the personalized lineup 230.

In some embodiments, the recommendation module 112 may treat the time slots as being fluid and make determinations based on the start times of available media content. In this respect, the recommendation module 112 may greedily select the best media content and fill any open time slots with the greedily selected media content. Accordingly, the time slots can be of any duration and have any start time (within the bounds of the current start time). The recommendation module 112 may also take into account the amount of time (overlap) available to be watched of the media content being considered. For example, if a first media content is extremely relevant but is or will be 75% finished for the time slot being considered, while a second media content is a little bit less relevant but is or will be only 5% finished for the time slot being considered, then the second media content may be selected based on these timing considerations, despite the first media content being more relevant to the user.

In some embodiments, the user can use the same selection features discussed above to select media content options 252 for future time slots. For example, in FIG. 2B, the user could have selected the time slot 232 corresponding to the 9:00 pm-9:30 pm time period instead of the time slot 232 corresponding to the 8:00 pm-9:00 pm time period in order to view media content options 252 for the 9:00 pm-9:30 pm time period and select one of the media content options 252 to the corresponding time slot 232 for that time period. In response to such selections to assign different media content options 252 to future time slots 232, the recommendation module 112 can update the personalized lineup 230 to reflect that selection, as well as adjust future recommendations based on the new time considerations and the new indications of interest in additional media content.

Figure 3:
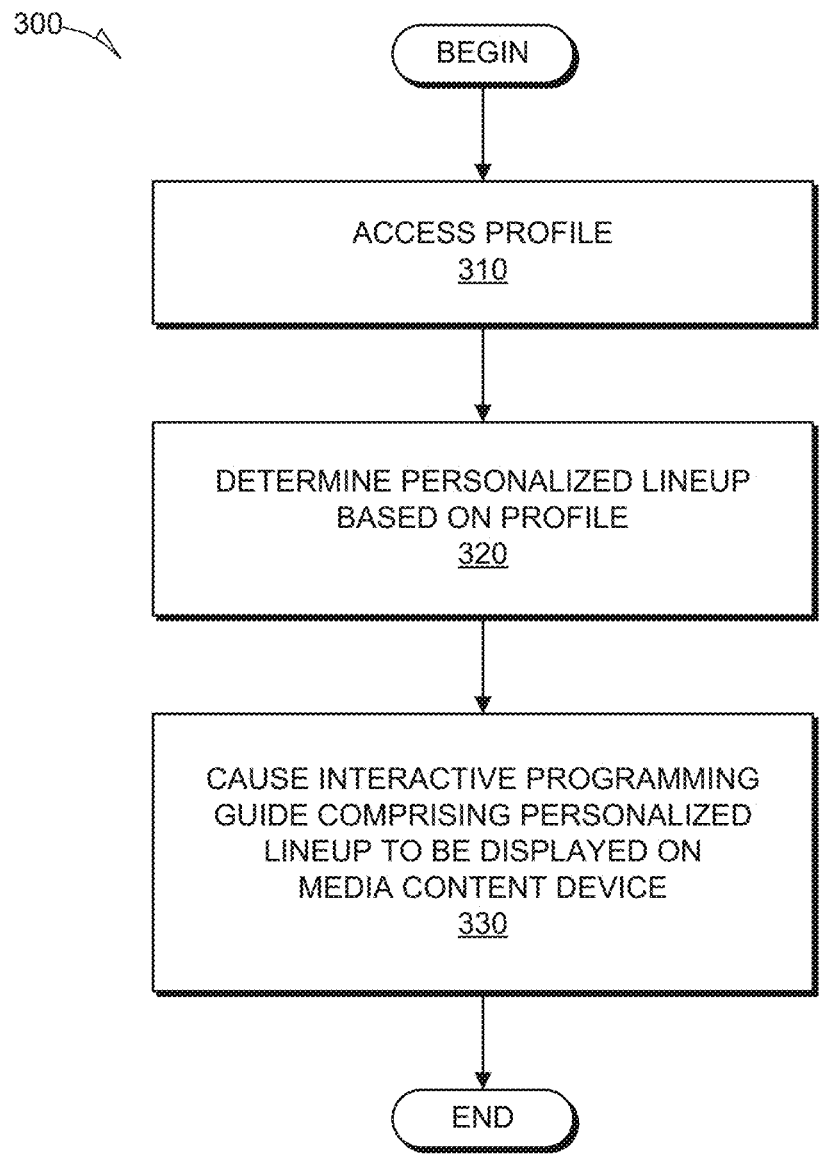
FIG. 3 is a flowchart illustrating a method of providing an interactive programming guide with a personalized lineup, in accordance with an example embodiment.

FIG. 3 is a flowchart illustrating a method 300 of providing an interactive programming guide with a personalized lineup, in accordance with an example embodiment. The operations of method 300 may be performed by a system or modules of a system (e.g., interactive programming guide system 100 or recommendation module 112 in FIG. 1). At operation 310, a profile 116 of a user can be accessed. At operation 320, a personalized lineup 230 can be determined based on the profile 116 of the user. The personalized lineup 230 may comprise a corresponding media content identification assigned to each one of a plurality of sequential time slots 232. Each media content identification can identify media content for the corresponding time slot 232. At operation 330, a first interactive programming guide can be caused to be displayed on a first media content device 120 associated with the user. The first interactive programming guide may comprise the personalized lineup 230. It is contemplated that the operations of method 300 may incorporate any of the other features disclosed herein.

Figure 4:
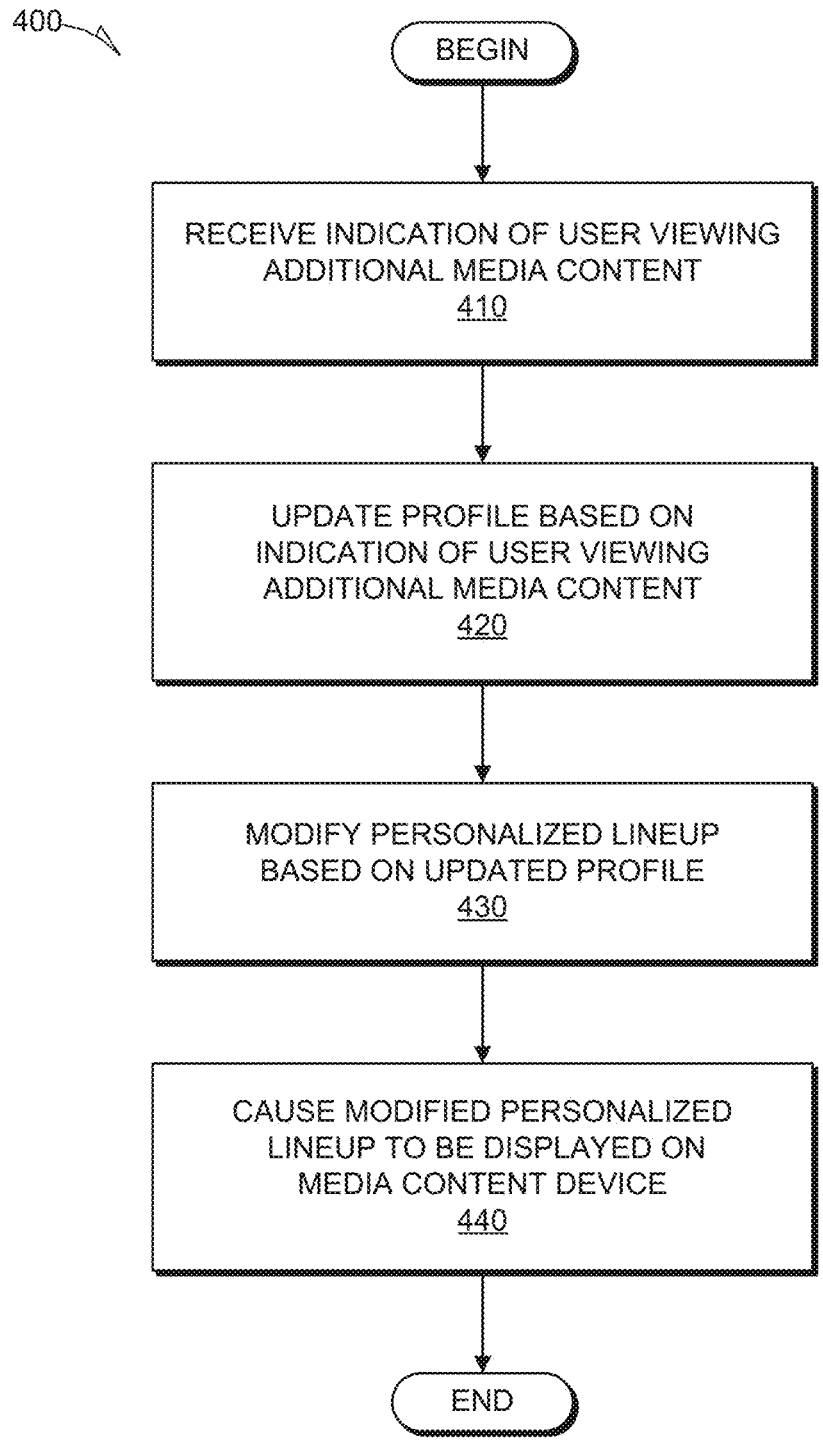
FIG. 4 is a flowchart illustrating a method of modifying a personalized lineup of an interactive programming guide, in accordance with an example embodiment.

FIG. 4 is a flowchart illustrating a method 400 of modifying a personalized lineup of an interactive programming guide, in accordance with an example embodiment. The operations of method 400 may be performed by a system or modules of a system (e.g., interactive programming guide system 100 or recommendation module 112 in FIG. 1). At operation 410, an indication of the user viewing additional media content can be received. At operation 420, the profile 116 of the user can be updated based on the indication of the user viewing the additional media content. At operation 430, the personalized lineup 230 can be modified based on the updated profile 116. At operation 440, the modified personalized lineup 230 can be caused to be displayed on the first media content device 120. It is contemplated that the operations of method 400 may incorporate any of the other features disclosed herein.

Figure 5:
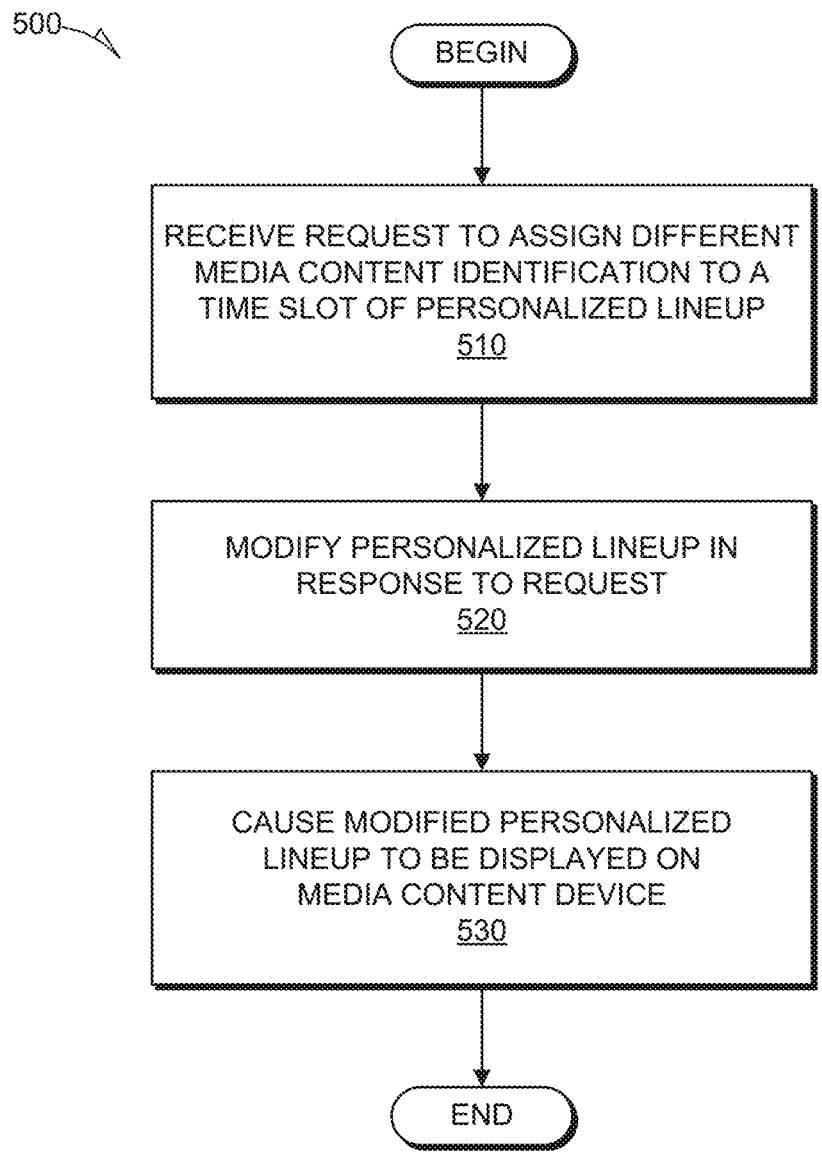
FIG. 5 is a flowchart illustrating another method of modifying a personalized lineup of an interactive programming guide, in accordance with an example embodiment.

FIG. 5 is a flowchart illustrating another method of modifying a personalized lineup of an interactive programming guide, in accordance with an example embodiment. The operations of method 500 may be performed by a system or modules of a system (e.g., interactive programming guide system 100 or recommendation module 112 in FIG. 1). At operation 510, a request to assign a first different media content identification to a first one of the time slots 232 can be received via the first interactive programming guide. At operation 520, the personalized lineup 230 can be modified in response to the request to assign the first different media content identification to the first one of the time slots 232. Modifying the personalized lineup 230 may comprise assigning the first different media content identification to the first one of the time slots 232, determining a second different media content identification to assign to a second one of the time slots 232 based on the assigning of the first different media content identification to the first one of the time slots 232, and assigning the second different media content identification to the second one of the time slots 232. At operation 530, the modified personalized lineup 230 can be caused to be displayed on the first media content device 120. It is contemplated that the operations of method 500 may incorporate any of the other features disclosed herein.

Figure 6:
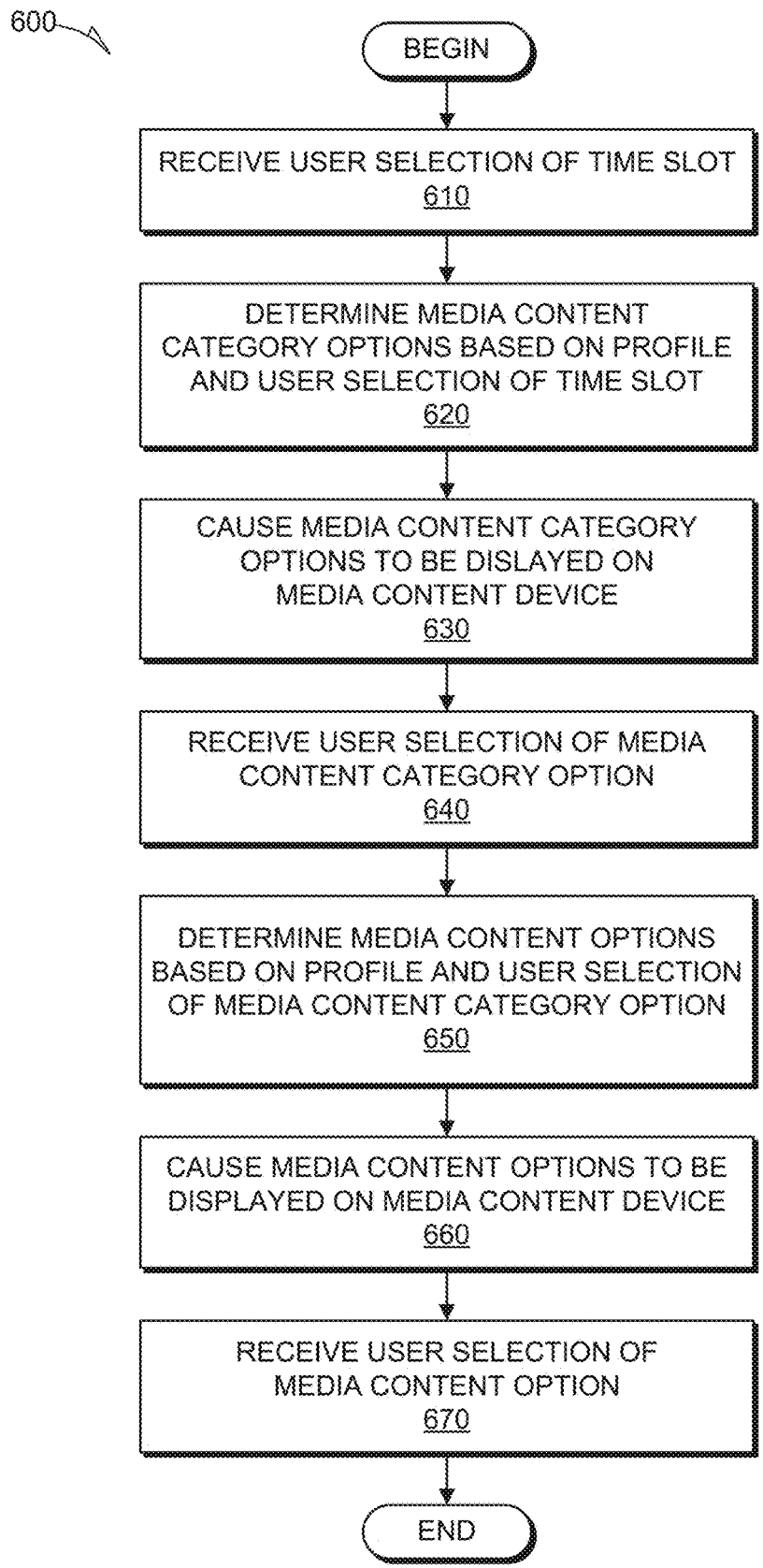
FIG. 6 is a flowchart illustrating a method of receiving a request to assign a different media content identification to a time slot in a personalized lineup, in accordance with an example embodiment.

FIG. 6 is a flowchart illustrating a method of receiving a request to assign a different media content identification to a time slot in a personalized lineup, in accordance with an example embodiment. The operations of method 600 may be performed by a system or modules of a system (e.g., interactive programming guide system 100 or recommendation module 112 in FIG. 1). At operation 610, a user selection of the first one of the time slots 232 of the personalized lineup 230 can be received. At operation 620, a plurality of media content category options 242 can be determined based on the profile 116 of the user and the user selection of the first one of the time slots 232. At operation 630, the plurality of media content category options 242 can be caused to be displayed on the first media content device 120. At operation 640, a user selection of one of the media content category options 242 can be received. At operation 650, a plurality of media content options 252 can be determined based on the profile 116 of the user and the user selection of the one of the media content category options 242. At operation 660, the plurality of media content options 252 can be caused to be displayed on the first media content device 120. At operation 670, a user selection of one of the media content options 252 can be received. The selected media content option 252 can correspond to the first different media content identification that was previously discussed. It is contemplated that the operations of method 600 may incorporate any of the other features disclosed herein.

Figure 7A:
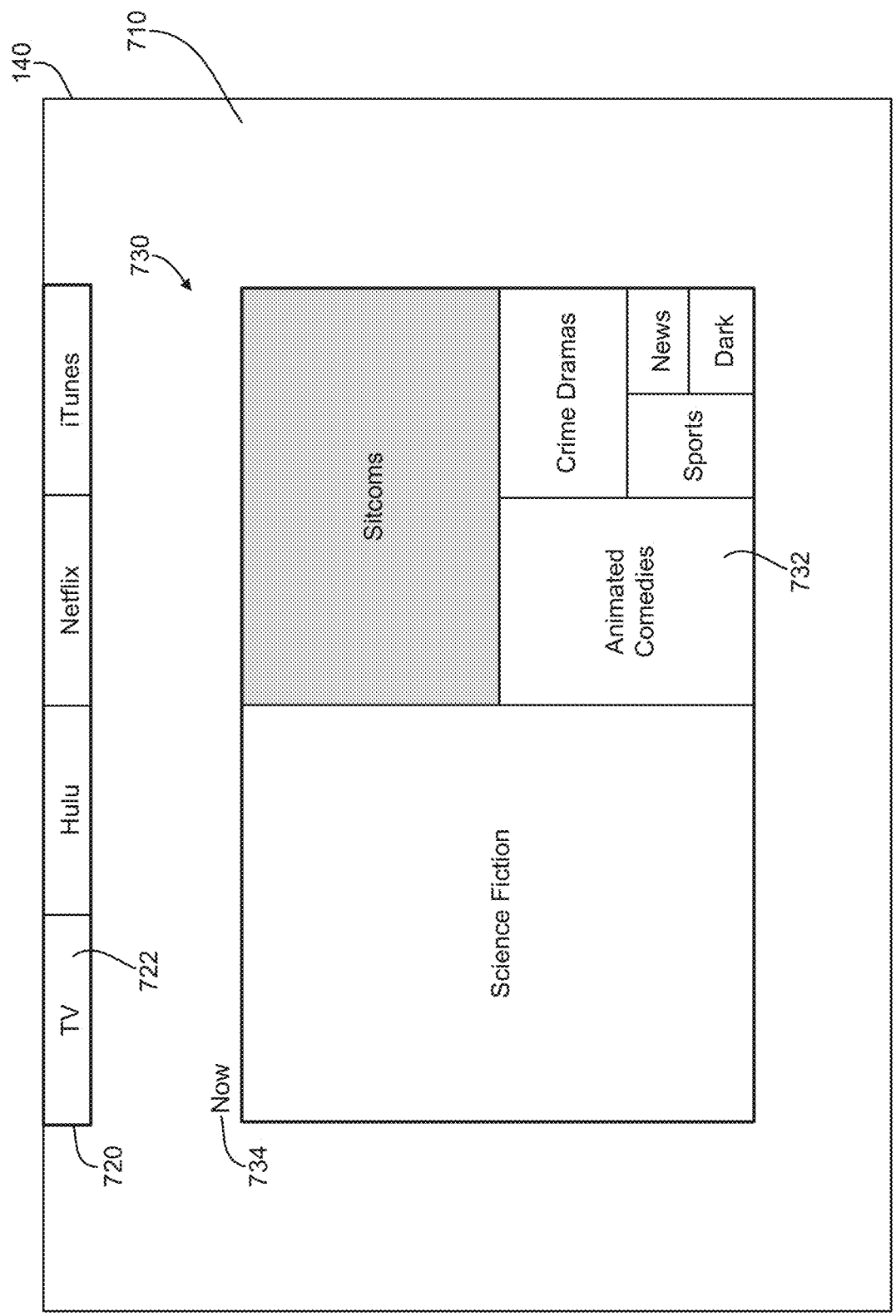
FIGS. 7A-7C illustrate an interactive programming guide being used on a second media content device, in accordance with an example embodiment.
Figure 7B:
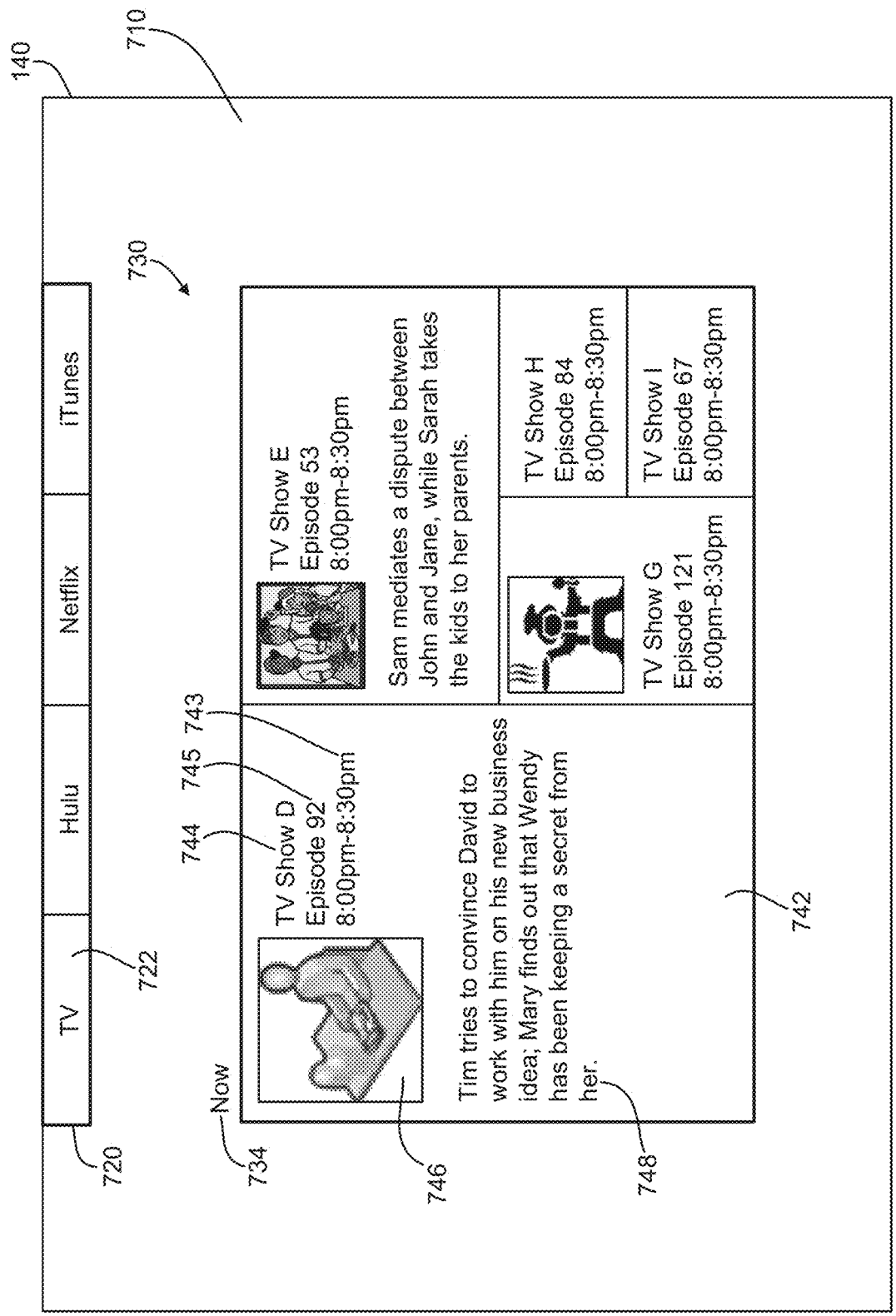
Figure 7C:
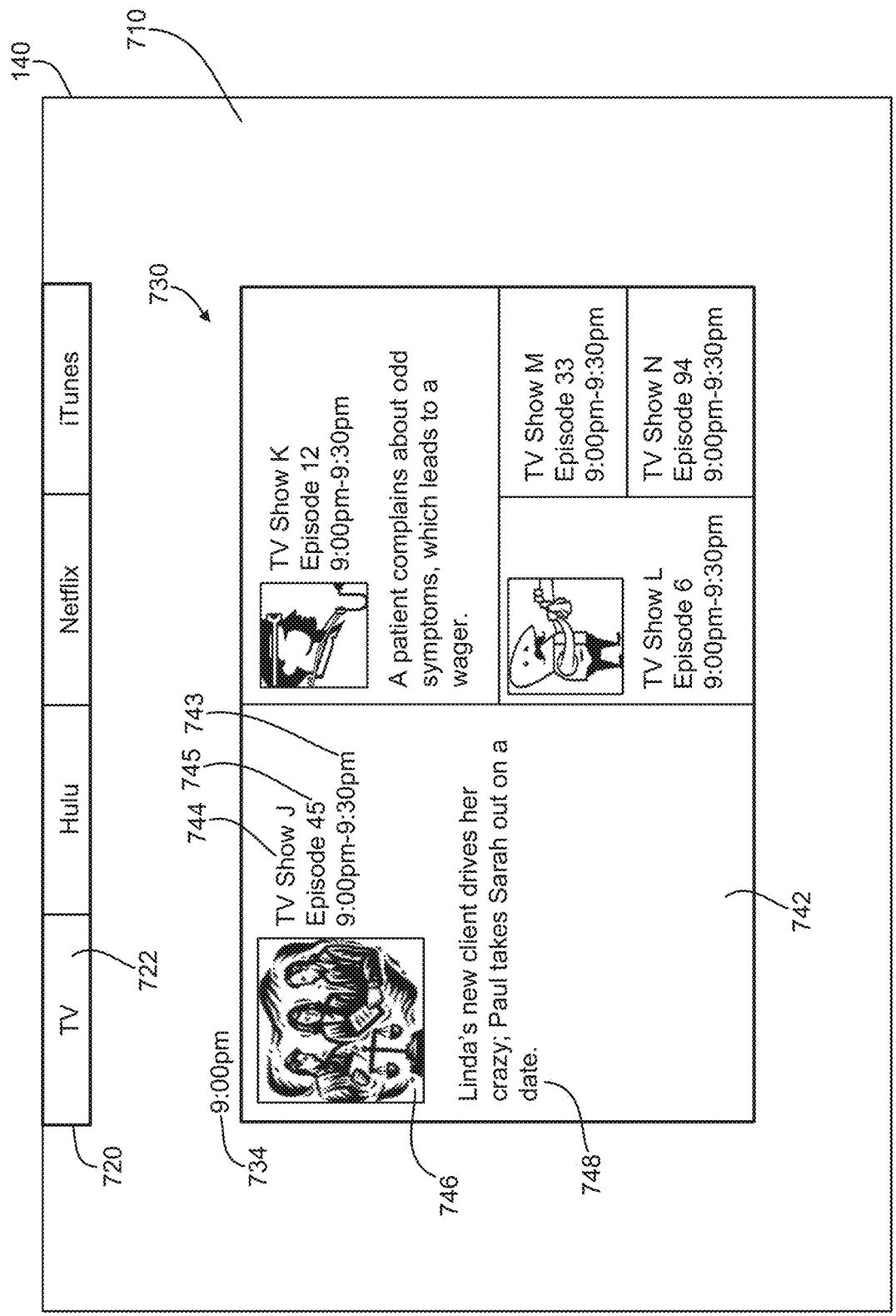

In some embodiments, the interactive programming guide can be provided on one or more other media content devices, such as second media content device 140, while media content 220 is being viewed on the first media content device 120. FIGS. 7A-7C illustrate an interactive programming guide 730 being provided and used on second media content device 140, in accordance with an example embodiment. In some embodiments, the second media content device 140 can be used as a remote control for the first media content device 120. Accordingly, the second media content device 140 can communicate with components of the interactive programming guide system 100, first media content device 120, and/or media tuner/player device(s) 130.

The second media content device 140 comprises a display screen 710 on which to display an interactive programming guide 730. Since the second media content device 140 can be used as a remote control, as opposed to the main device on which media content is being viewed, the interactive programming guide 730 can be configured to display more information than the interactive programming guide on the first media content device 120, since screen space on the second media content device 140 does not have to be shared with the media content 220 being watched.

As seen in FIG. 7A, the recommendation module 112 can determine media content category options 732 for display in the interactive programming guide 730 on the second media content device 140. The same determination process discussed above with respect to the determination of media content category options 242 can be used in the determination of media content category options 732. As seen in FIG. 7A, given the additional unused display space on second media content device 140, the interactive programming guide 730 may provide more media content category options 732. For example, whereas the media content category options 242 in FIG. 2B only included Science Fiction, Sitcoms, Animated Comedies, Crime Dramas, and Sports, the media content category options 732 in FIG. 7A may further include News and Dark (e.g., as in dark mood themed media content).

Furthermore, given the additional unused display space on second media content device 140, the interactive programming guide 730 may display the media content category options 732 with corresponding sizes that have a direct relationship to how relevant they are to the user. In some embodiments, the recommendation module 112 can use the previously discussed relevance measurements to determine how prominently displayed (e.g., how large) each media content category option 732 should be. For example, in FIG. 7A, the most relevant media content category option 732 (Science Fiction) can be displayed with the largest size, the second most relevant media content category option 732 (Sitcoms) can be displayed with the second largest size, the third most relevant media content category option 732 (Animated Comedies) can be displayed with the third largest size, the fourth most relevant media content category option 732 (Crime Dramas) can be displayed with the fourth largest size, and so on and so forth. In some embodiments, the interactive programming guide 730 may cause each one of the identifications of media content category options 732 to be displayed having a corresponding indicator, other than size, that has a direct relationship with the corresponding relevance measurement of the corresponding media content category option 732. Examples of other such indicators include, but are not limited to, color and positioning on the display screen.

As seen in FIG. 7B, in response to the user selecting one of the media content category options 732 (e.g., Sitcoms), the recommendation module 112 can provide media content options 742 for display in the interactive programming guide 730 on the second media content device 140. The same determination process discussed above with respect to the determination of media content options 252 can be used in the determination of media content options 742.

Similar to the media content category options 732, given the additional unused display space on second media content device 140, the interactive programming guide 730 may provide more media content options 742 on the second media content device 140 than the media content options 252 provided on the first media content device 120. Furthermore, similar to the display of the media content category options 732 discussed above, the interactive programming guide 730 may display the media content options 742 with corresponding sizes that have a direct relationship to how relevant they are to the user. In some embodiments, the recommendation module 112 can use the previously discussed relevance measurements to determine how prominently displayed (e.g., how large) each media content option 742 should be. For example, in FIG. 7B, the most relevant media content option 742 (TV Show D) can be displayed with the largest size, the second most relevant media content option 742 (TV Show E) can be displayed with the second largest size, the third most relevant media content option 742 (TV Show G) can be displayed with the third largest size, and so on and so forth. In some embodiments, the interactive programming guide 730 may cause each one of the identifications of media content options 742 to be displayed having a corresponding indicator, other than size, that has a direct relationship with the corresponding relevance measurement of the corresponding media content option 742. Examples of other such indicators include, but are not limited to, color and positioning on the display screen.

Each media content option 742 may comprise information about the corresponding media content. For example, media content options 742 may comprise an indication 743 of the time period to which the selected media content option 742 corresponds, as well as corresponding media content identification information that identifies the selected media content option 742. The media content identification information may comprise a name/title 744 of the media content, an episode identification 745, and/or an image 746 (e.g., show/movie logo) corresponding to the media content. The media content options 742 may also comprise a plot description 248 of the corresponding media content options 742. Although not shown, the media content identification information can also comprise an indication of the source (e.g., what television channel or what web-based source) of the corresponding media content option 742. In some embodiments, the smaller the size of a media content option 742, the less information may be displayed for it. For example, less relevant media content options 742 may omit an image 746 and a plot description 748. It is contemplated that other information and configurations are also within the scope of the present disclosure.

In some embodiments, the user can select one of the media content options 742 via the interactive programming guide 730 on the second media content device 140. In response to the user's selection of the media content option 742 via the interactive programming guide 730 on the second media content device 140, the media content corresponding to the selected media content option 742 can be caused to be displayed on the first media content device 120. Additionally, one or more corresponding profiles 116 may be updated based on the selection of the media content option 742.

In some embodiments, the user can view media content category options 732 and/or media content options 742 for future time periods. For example, as seen in FIG. 7C, the user can navigate ahead to a different time period 734 (e.g., 9:00 pm) to view recommendations that have been determined for that time period 734. The user can use hand gestures (e.g., a swiping motion) to navigate to other time periods. Other configurations and methods of navigation are also within the scope of the present disclosure.

Furthermore, the user can change the media content options 742 that are displayed for a particular time period using any of the features discussed herein. For example, drawers or other graphical user interface elements can be used to provide selectable options for the user. The user can then configure the interactive programming guide 730 as he or she sees fit. The recommendation module 12 can then use these customization indications provided by the user in determining subsequent categories and media content to recommend.

In some embodiments, a media content source menu 720 may be displayed. The media content source menu 720 may comprise selectable media content source options 722 from which the user can select to filter options for the interactive programming guide 730.

Figure 8:
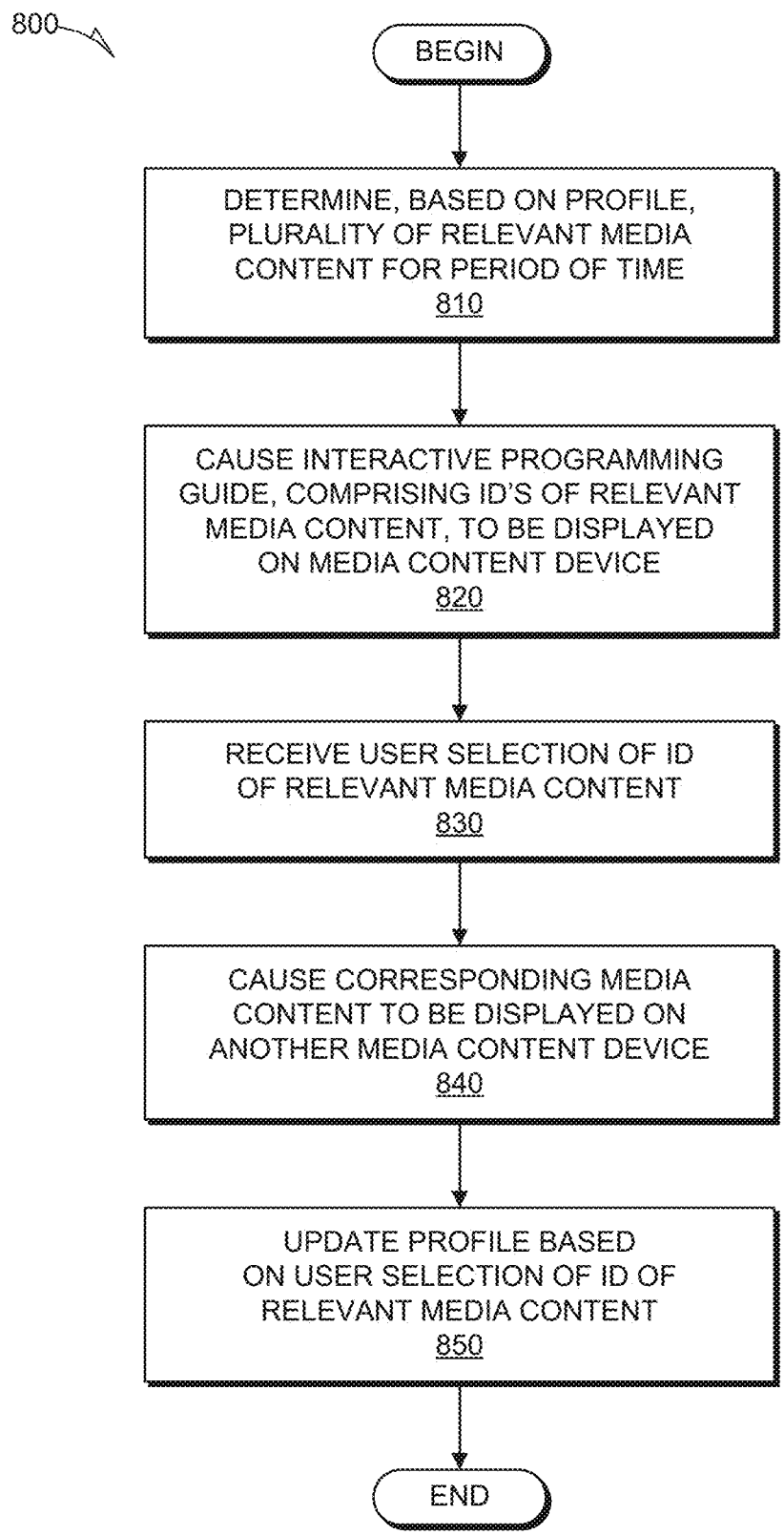
FIG. 8 is a flowchart illustrating a method of providing an interactive programming guide on a second media content device, in accordance with an example embodiment.

FIG. 8 is a flowchart illustrating a method 800 of providing an interactive programming guide on a second media content device, in accordance with an example embodiment. The operations of method 800 may be performed by a system or modules of a system (e.g., interactive programming guide system 100 or recommendation module 112 in FIG. 1). At operation 810, a plurality of relevant media content can be determined, based on a profile 116 of a user, for a first period of time 734 from a plurality of available media content that are available to be viewed during the first period of time 734. At operation 820, an interactive programming guide 730 can be caused to be displayed on a second media content device 140. The interactive programming guide 730 may comprise identifications of the relevant media content for the first period of time 734. At operation

830, a user selection of one of the identifications of relevant media content can be received via the interactive programming guide 730. At operation 840, media content corresponding to the selected identification of relevant media content can be caused to be displayed on the first media content device 120 in response to receiving the user selection of the identification of relevant media content. At operation 850, one or more profiles 116 of the user can be updated based on the user selection of the identification of relevant media content. It is contemplated that the operations of method 800 may incorporate any of the other features disclosed herein.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
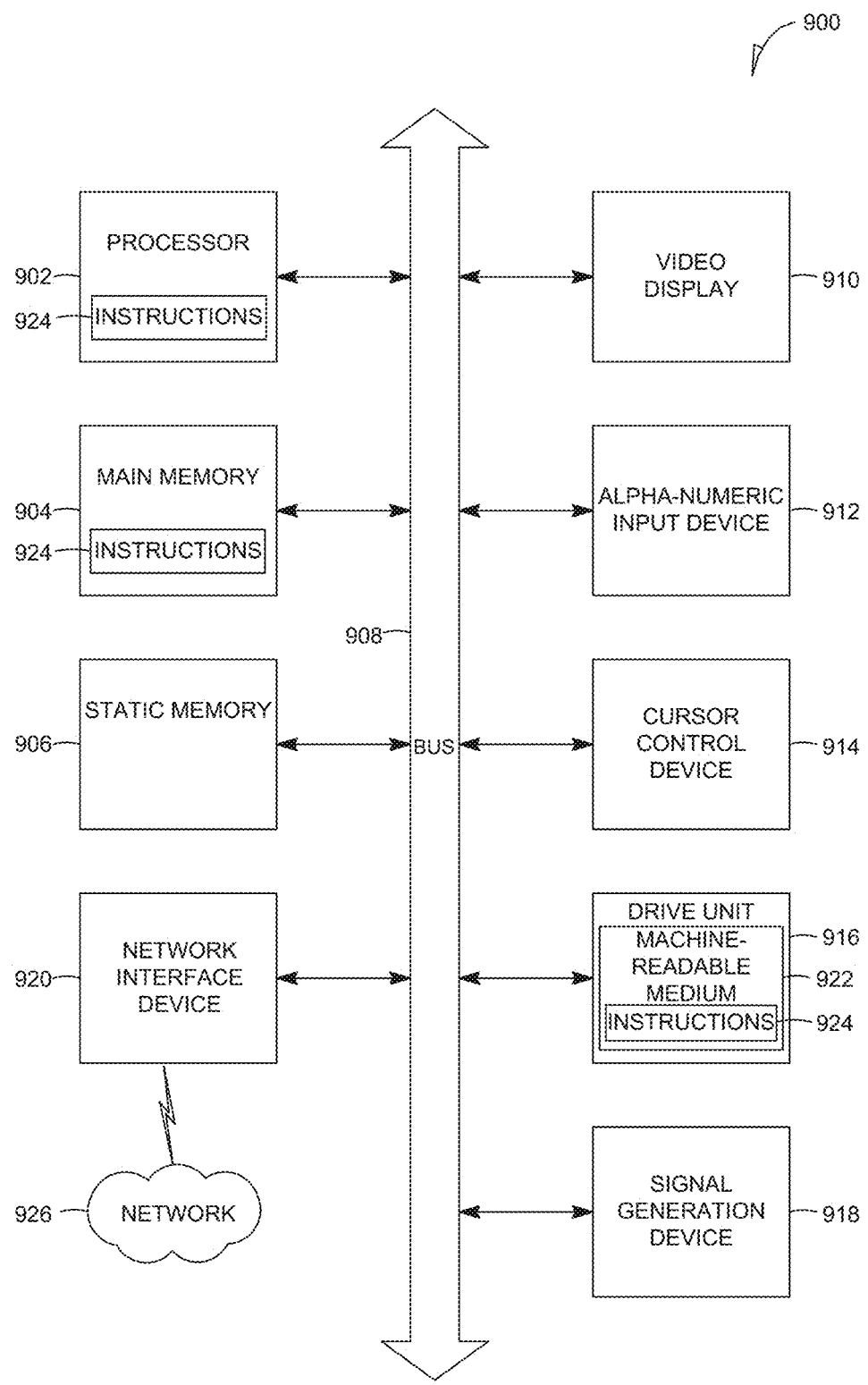
FIG. 9 is a block diagram of an example computer system on which methodologies described herein may be executed, in accordance with an example embodiment.

FIG. 9 is a block diagram of a machine in the example form of a computer system 900 within which instructions 924 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   at least one processor; and
   a machine-readable medium storing executable instructions which, when executed, cause the at least one processor to perform operations including:

in response to a first selection of a first time slot of a plurality of time slots included in a personalized lineup of an interactive programming guide to be displayed on a media content device, displaying a plurality of media content category options on the media content device, the personalized lineup corresponding to a user profile;

in response to a second selection of a first media content category option, displaying a plurality of media content options on the media content device, the plurality of media content options determined by:
    ranking relevance measurements for the plurality of media content options based on the user profile; and
    determining a presentation order of the plurality of media content options for the first media content category option based on the ranking; and in response to a third selection of a first media content option of the plurality of media content options from the first media content category option, modifying the first time slot of the plurality of time slots to assign a media content identification corresponding to the first media content option of the plurality of media content options to the first time slot of the plurality of time slots.

2. The system of claim 1, wherein the plurality of media content options are determined by determining the relevance measurements for the plurality of media content options based on the user profile, the user profile corresponding to at least one of a profile of a group of users or a profile of one or more devices.

3. The system of claim 1, wherein determining the relevance measurements is based on a history included in the user profile corresponding to a display of media of the first one of the plurality of media content options of the first media content category option during a specific time of day or a display of media of the first media content category option after media of a second media content category option has been displayed.

4. The system of claim 1, wherein determining the relevance measurements is based on an interaction of the user profile with one or more of the plurality of media content options, the interaction causing a downgrading or an upgrading in future relevance measurement determinations.

5. The system of claim 1, wherein determining the relevance measurements is based on a purchase corresponding to the user profile.

6. The system of claim 1, wherein the interactive programming guide is a first interactive programming guide, further including displaying a second interactive programming guide on a second media content device, the second interactive programming guide including a second plurality of media content category options not included in the plurality of media content category options included in the first interactive programming guide.

7. The system of claim 6, wherein a display size of each of the second plurality of media content category options included in the second interactive programming guide are based on relevance to the user profile.

8. A computer-implemented method comprising:
in response to a first selection of a first time slot of a plurality of time slots included in a personalized lineup of an interactive programming guide to be displayed on a media content device, displaying a plurality of media content category options on the media content device, the personalized lineup corresponding to a user profile;
in response to a second selection of a first media content category option, displaying a plurality of media content options on the media content device, the plurality of media content options determined by:
    ranking relevance measurements for the plurality of media content options based on the user profile; and
    determining a presentation order of the plurality of media content options for the first media content category option based on the ranking; and in response to a third selection of a first media content option of the plurality of media content options from the first media content category option, modifying the first time slot of the plurality of time slots to assign a media content identification corresponding to the first media content option of the plurality of media content options to the first time slot of the plurality of time slots.

9. The method of claim 8, wherein the plurality of media content options are determined by determining the relevance measurements for the plurality of media content options based on the user profile, the user profile corresponding to at least one of a profile of a group of users or a profile of one or more devices.

10. The method of claim 8, wherein determining the relevance measurements is based on a history included in the user profile corresponding to a display of media of the first one of the plurality of media content options of the first media content category option during a specific time of day or a display of media of the first media content category option after media of a second media content category option has been displayed.

11. The method of claim 8, wherein determining the relevance measurements is based on an interaction of the user profile with one or more of the plurality of media content options, the interaction causing a downgrading or an upgrading in future relevance measurement determinations.

12. The method of claim 8, wherein determining the relevance measurements is based on a purchase corresponding to the user profile.

13. The method of claim 8, wherein the interactive programming guide is a first interactive programming guide, further including displaying a second interactive programming guide on a second media content device, the second interactive programming guide including a second plurality of media content category options not included in the plurality of media content category options included in the first interactive programming guide.

14. The method of claim 13, wherein a display size of each of the second plurality of media content category options included in the second interactive programming guide are based on relevance to the user profile.

15. A non-transitory machine-readable medium including instructions which, when executed, cause a machine to at least:
in response to a first selection of a first time slot of a plurality of time slots included in a personalized lineup of an interactive programming guide to be displayed on a media content device, display a plurality of media content category options on the media content device, the personalized lineup corresponding to a user profile;
in response to a second selection of a first media content category option, display a plurality of media content options on the media content device, the plurality of media content options determined by:
    rank relevance measurements for the plurality of media content options based on the user profile; and
    determine a presentation order of the plurality of media content options for the first media content category option based on the ranking; and in response to a third selection of a first media content option of the plurality of media content options from the first media content category option, modifying the first time slot of the plurality of time slots to assign a media content identification corresponding to the first media content option of the plurality of media content options to the first time slot of the plurality of time slots.

16. The non-transitory machine-readable medium of claim 15, further comprising instructions which, when executed, cause the machine to at least determine the relevance measurements for the plurality of media content options based on the user profile, the user profile corresponding to at least one of a profile of a group of users or a profile of one or more devices.

17. The non-transitory machine-readable medium of claim 15, wherein determining the relevance measurements is based on a history included in the user profile corresponding to a display of media of the first one of the plurality of media content options of the first media content category option during a specific time of day or a display of media of the first media content category option after media of a second media content category option has been displayed.

18. The non-transitory machine-readable medium of claim 15, wherein determining the relevance measurements is based on an interaction of the user profile with one or more of the plurality of media content options, the interaction causing a downgrading or an upgrading in future relevance measurement determinations.

19. The non-transitory machine-readable medium of claim 15, wherein the interactive programming guide is a first interactive programming guide, further including instructions which, when executed, cause the machine to at least display a second interactive programming guide on a second media content device, the second interactive programming guide including a second plurality of media content category options not included in the plurality of media content category options included in the first interactive programming guide.

20. The non-transitory machine-readable medium of claim 19, wherein a display size of each of the second plurality of media content category options included in the second interactive programming guide are based on relevance to the user profile.

* * * * *